United States Patent
Barinov

(10) Patent No.: US 9,578,171 B2
(45) Date of Patent: *Feb. 21, 2017

(54) LOW LATENCY DISTRIBUTED AGGREGATION FOR CONTACT CENTER AGENT-GROUPS ON SLIDING INTERVAL

(71) Applicant: Genesys Telecommunications Laboratories, Inc., Daly City, CA (US)

(72) Inventor: Vitaly Y. Barinov, Clayton, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,799

(22) Filed: Mar. 26, 2014

(65) Prior Publication Data

US 2014/0294169 A1    Oct. 2, 2014

Related U.S. Application Data

(60) Provisional application No. 61/805,513, filed on Mar. 26, 2013.

(51) Int. Cl.
*H04M 3/51* (2006.01)

(52) U.S. Cl.
CPC .................. *H04M 3/5175* (2013.01)

(58) Field of Classification Search
CPC .................................................. H04M 3/5175
USPC ................. 379/265.01–265.09, 309
See application file for complete search history.

(56) References Cited

U.S. PATENT DOCUMENTS

| | | | |
|---|---|---|---|
| 5,937,051 A | | 8/1999 | Hurd et al. |
| 5,995,614 A | * | 11/1999 | Miloslavsky ............ 379/265.11 |
| 6,021,428 A | | 2/2000 | Miloslavsky |
| 6,055,308 A | | 4/2000 | Miloslavsky et al. |

(Continued)

FOREIGN PATENT DOCUMENTS

EP        2306381 A1      4/2011

OTHER PUBLICATIONS

Hypergraph—Wikipedia, http://en.wikipedia.org/wiki/Hypergraph, as captured on Mar. 29, 2013, 8 pages.

(Continued)

*Primary Examiner* — Harry S Hong
(74) *Attorney, Agent, or Firm* — Lewis Roca Rothgerber Christie LLP

(57) ABSTRACT

A method and system for aggregating and reporting data from a plurality of data sources in a contact center is provided. The method includes: maintaining by a computer device the data for a sliding interval including a plurality of panes, the data including an ongoing component for ongoing events and a completed component for completed events; updating by the computer device the data for the sliding interval based on updates for the sliding interval received from one or more of the data sources; and reporting by the computer device an aggregation of the ongoing and completed components of the data sources for the sliding interval to a client in accordance with an expiring of one of the panes. The system includes a processor and a non-transitory physical medium. The medium has instructions stored thereon that, when executed by the processor, causes the processor to execute the method.

20 Claims, 24 Drawing Sheets

(56) References Cited

U.S. PATENT DOCUMENTS

| | | | |
|---|---|---|---|
| 6,134,315 A | 10/2000 | Galvin | |
| 6,377,567 B1* | 4/2002 | Leonard | 370/352 |
| 6,393,472 B1 | 5/2002 | Anerousis et al. | |
| 6,404,883 B1 | 6/2002 | Hartmeier | |
| 6,625,139 B2 | 9/2003 | Miloslavsky et al. | |
| 6,650,748 B1 | 11/2003 | Edwards et al. | |
| 6,834,303 B1 | 12/2004 | Garg et al. | |
| 6,868,152 B2 | 3/2005 | Statham et al. | |
| 6,879,586 B2 | 4/2005 | Turovsky et al. | |
| 6,985,943 B2 | 1/2006 | Deryugin et al. | |
| 7,376,227 B2 | 5/2008 | Anisimov et al. | |
| 7,490,145 B2 | 2/2009 | Sylor et al. | |
| 7,526,540 B2 | 4/2009 | Gopisetty et al. | |
| 7,602,725 B2 | 10/2009 | Vaught | |
| 7,701,925 B1 | 4/2010 | Mason et al. | |
| 7,817,796 B1 | 10/2010 | Clippinger et al. | |
| 7,936,867 B1 | 5/2011 | Hill et al. | |
| 8,023,637 B2 | 9/2011 | Irwin et al. | |
| 8,031,860 B2 | 10/2011 | Coussement | |
| 8,146,000 B1 | 3/2012 | Boliek et al. | |
| 8,391,463 B1 | 3/2013 | Kiefhaber et al. | |
| 8,510,807 B1 | 8/2013 | Elazary et al. | |
| 8,588,398 B1 | 11/2013 | Irwin et al. | |
| 8,594,306 B2 | 11/2013 | Laredo et al. | |
| 8,630,399 B2 | 1/2014 | D'Arcy et al. | |
| 8,634,541 B2 | 1/2014 | Flockhart et al. | |
| 8,675,859 B2 | 3/2014 | Mandalia et al. | |
| 8,701,128 B2 | 4/2014 | Salt et al. | |
| 8,719,067 B2 | 5/2014 | Fama et al. | |
| 8,792,633 B2 | 7/2014 | Barinov | |
| 2002/0046273 A1 | 4/2002 | Lahr et al. | |
| 2002/0095462 A1 | 7/2002 | Beck et al. | |
| 2002/0110113 A1 | 8/2002 | Wengrovitz | |
| 2002/0156599 A1 | 10/2002 | Oosthoek et al. | |
| 2003/0018702 A1 | 1/2003 | Broughton et al. | |
| 2003/0115317 A1 | 6/2003 | Hickson et al. | |
| 2003/0198183 A1 | 10/2003 | Henriques et al. | |
| 2004/0028212 A1 | 2/2004 | Lok et al. | |
| 2004/0044585 A1 | 3/2004 | Franco | |
| 2004/0088315 A1 | 5/2004 | Elder et al. | |
| 2004/0252822 A1* | 12/2004 | Statham et al. | 379/265.02 |
| 2005/0154637 A1 | 7/2005 | Nair et al. | |
| 2005/0210262 A1 | 9/2005 | Rolia et al. | |
| 2006/0159027 A1 | 7/2006 | Owens | |
| 2006/0195599 A1 | 8/2006 | Gedik et al. | |
| 2007/0226239 A1* | 9/2007 | Johnson et al. | 707/101 |
| 2008/0049928 A1* | 2/2008 | Miloslavsky et al. | 379/265.09 |
| 2008/0077470 A1 | 3/2008 | Yamanaka | |
| 2008/0225804 A1 | 9/2008 | Thubert et al. | |
| 2009/0271529 A1 | 10/2009 | Kashiyama et al. | |
| 2009/0316687 A1 | 12/2009 | Kruppa | |
| 2010/0002863 A1 | 1/2010 | Loftus et al. | |
| 2010/0020689 A1 | 1/2010 | Tang | |
| 2010/0106710 A1 | 4/2010 | Nishizawa et al. | |
| 2010/0250566 A1 | 9/2010 | Paul | |
| 2010/0293532 A1 | 11/2010 | Andrade et al. | |
| 2011/0055122 A1 | 3/2011 | Andreoli | |
| 2011/0119761 A1 | 5/2011 | Wang et al. | |
| 2011/0227754 A1 | 9/2011 | Hill | |
| 2011/0254732 A1 | 10/2011 | Martin et al. | |
| 2011/0283000 A1 | 11/2011 | McCormack et al. | |
| 2012/0079061 A1 | 3/2012 | Krebs | |
| 2012/0158995 A1 | 6/2012 | McNamee et al. | |
| 2013/0050199 A1 | 2/2013 | Chavez | |
| 2013/0204959 A1 | 8/2013 | Zhang et al. | |
| 2014/0126711 A1 | 5/2014 | Barinov | |
| 2014/0126713 A1 | 5/2014 | Ristock et al. | |
| 2014/0129617 A1 | 5/2014 | Barinov | |
| 2014/0143294 A1* | 5/2014 | Vitaly | 709/201 |
| 2014/0143373 A1* | 5/2014 | Vitaly | 709/217 |
| 2014/0280126 A1* | 9/2014 | Rash et al. | 707/736 |

OTHER PUBLICATIONS

Karypis, G., et al., Multilevel Hypergraph Partitioning: Applications in VLSI Domain, IEEE Transactions on Very Large Scale Integration (VLSI) Systems, vol. 7, No. 1, Mar. 1999, pp. 69-79.

Zoltan Developer's Guide: Quality Program; Zoltan Toolkit, http://www.cs.sandia.gov/zoltan/dev_html/dev_intro_sqe._html, as captured on Mar. 29, 2013, 6 pages.

Abadi, Daniel, "Problems with CAP, and Yahoo's little known NoSQL system", http://dbmsmusings.blogspot.com/2010/04/problems-with-cap-and-yahoos-little.html, (4 pages).

Anisimov, Nikolay et al., XML Based Framework for Contact Center Applications; Webist 2007—International Conference on Web Information Systems and Technologies, 2007, 8 pages.

Arasu, A., Widom, J. "Resource Sharing in Continuous Sliding-Window Aggregates", Proceedings of the 30th VLDB Confernece, Toronto, Canada 2004, (24 pages).

Birman, Kenneth P. et al., Exploiting Virtual Synchrony in Distributed Systems, Cornell University, ACM, 1987, pp. 123-138.

Cormode, G., et al., "Brief Announcement: Tracking Distributed Aggregates over Time-based Sliding Windows", PODC'11, Jun. 6-8, 2011, San Jose, California, USA, ACM 978-1-4503-0719-2/11/06, (2 pages).

Gilbert, S., and Lynch, N., "Brewer's Conjecture and the Feasibility of Consistent, Available, Partition-Tolerant Web Services", ACM SIGACT News, vol. 33 Issue 2 (2002), 51-59 (12 pages).

Han, J. And Kamber, M. "Data Mining: Concepts and Techniques", 2nd Edition., Morgan Kaufmann Publishers, Mar. 2006, (772 pages).

International Search Report and Written Opinion for PCT/US2013/071104, dated Feb. 27, 2014, 12 pages.

Lamport, Leslie, "Paxos Made Simple", ACM SIGACT News (Distributed ComputingColumn) 32, 4 (Whole No. 121, Dec. 2001), pp. 51-58 (14 pages).

Li, J et al., "No Pane, No Gain: Efficient Evaluation of Sliding-Window Aggregates over Data Streams", SIGMOD Record, vol. 34, No. 1, Mar. 2005, pp. 39-44 (6 pages).

Madden, S. et al. "TAG: a Tiny AGgregation Service for Ad-Hoc Sensor Networks", ACM SIGOPS Operating Systems Review—OSDI '02: Proceedings of the 5th symposium on Operating systems design and implementation, vol. 36 Issue SI, Winter 2002, 131-146 (16 pages).

Tanenbaum, Andrew S., Computer Networks, Fourth Edition, 2003, Prentice Hall PTR, 4 pages.

* cited by examiner

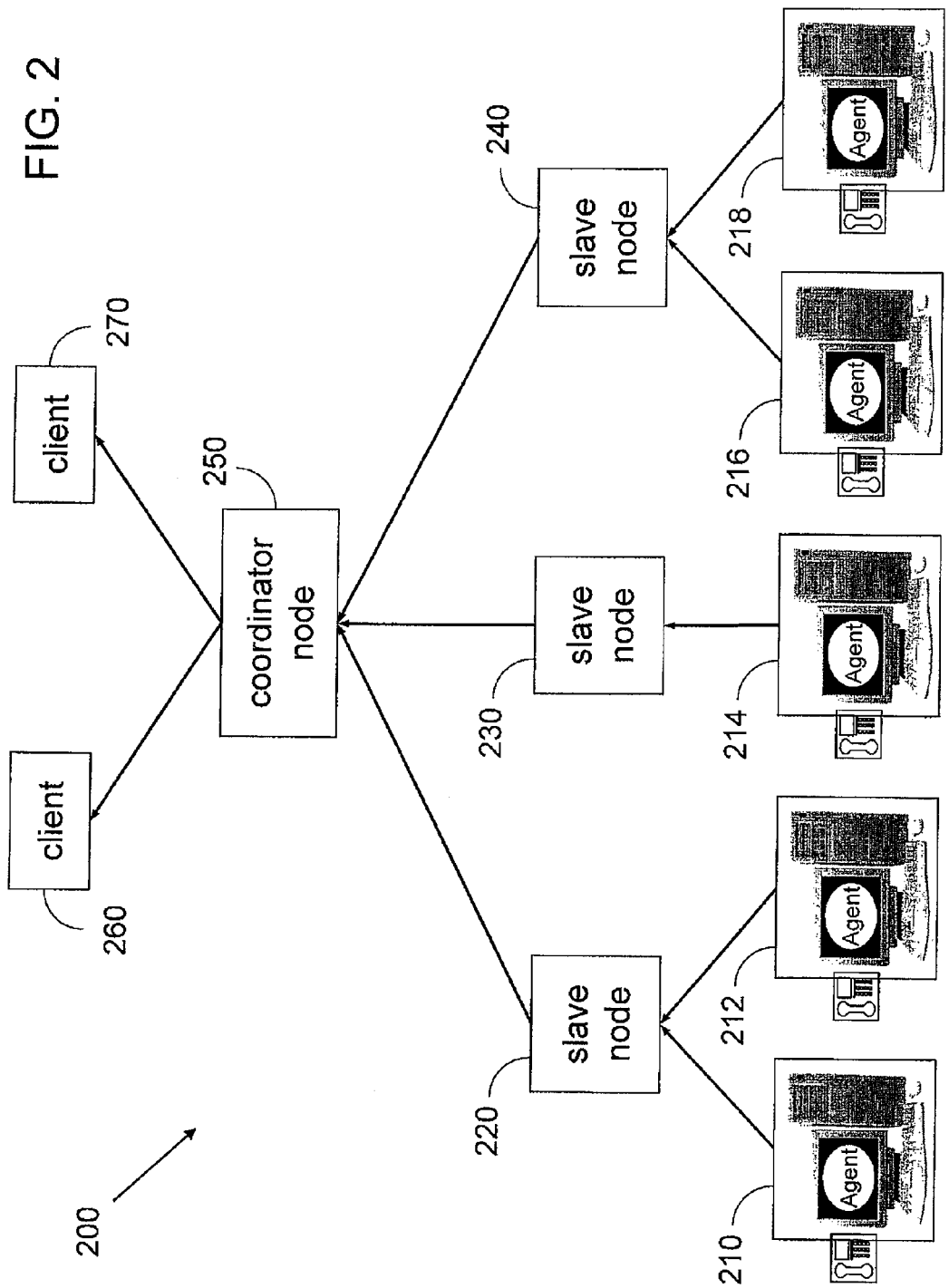

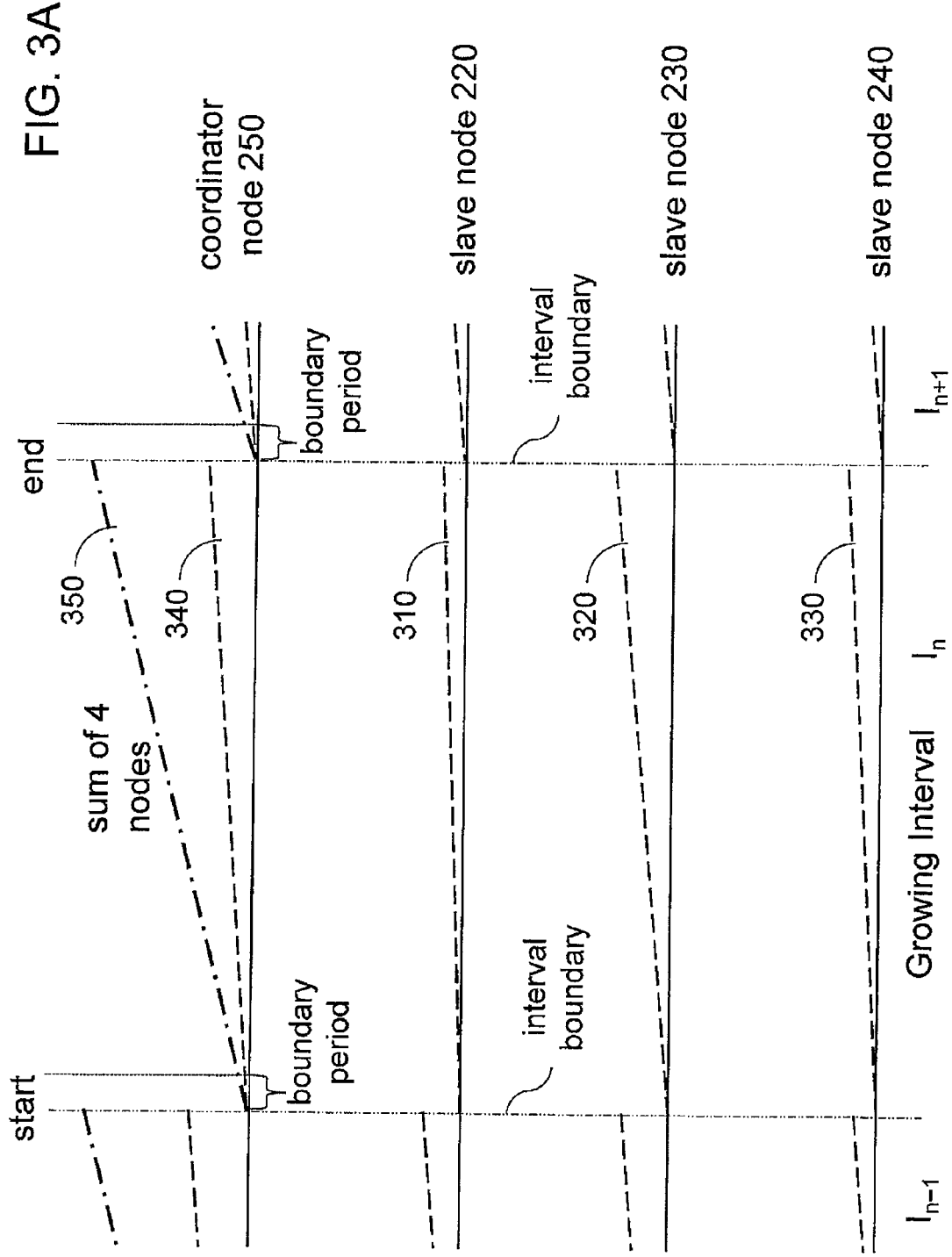

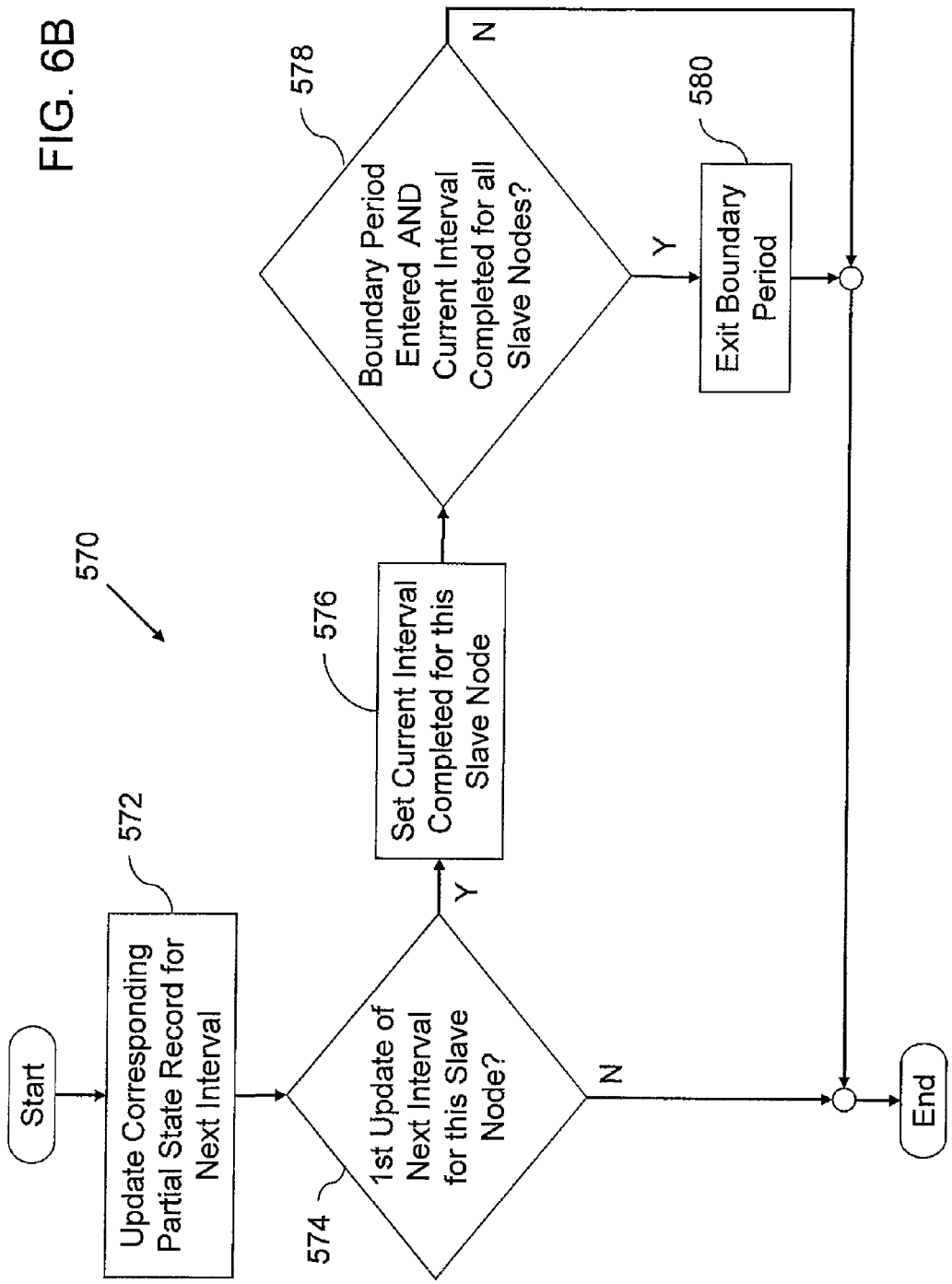

Aggregation operations    FIG. 12

- Ongoing(A) – returns ongoing component of aggregate A
- Historical(A) – returns historical component of A
- Refresh(A) – processes ongoing events (such as updating their statistics or handling their completion)
- Reset(A) – resets historical component of A
- A + B – "adds" or otherwise aggregates A and B
- A – B – "subtracts" B from A
- A \ B – "subtracts" ongoing component of B from A

Pane operations

FIG. 13

- $P = (A, T)$ – pane P includes aggregate A starting at time T
- GCP – global current pane being processed
- $R = (P_1, P_2, P_3, \ldots, P_{N-1})$ – circular array R of N−1 previous panes $P_1, P_2, P_3, \ldots, P_{N-1}$ in current sliding window W
- $R \ll GCP$ – insert global current pane into array R of N−1 previous panes (dropping oldest pane $P_1$)
- Aggregate(R, GCP) – returns the aggregate over ongoing and historical components of GCP and N−1 previous panes

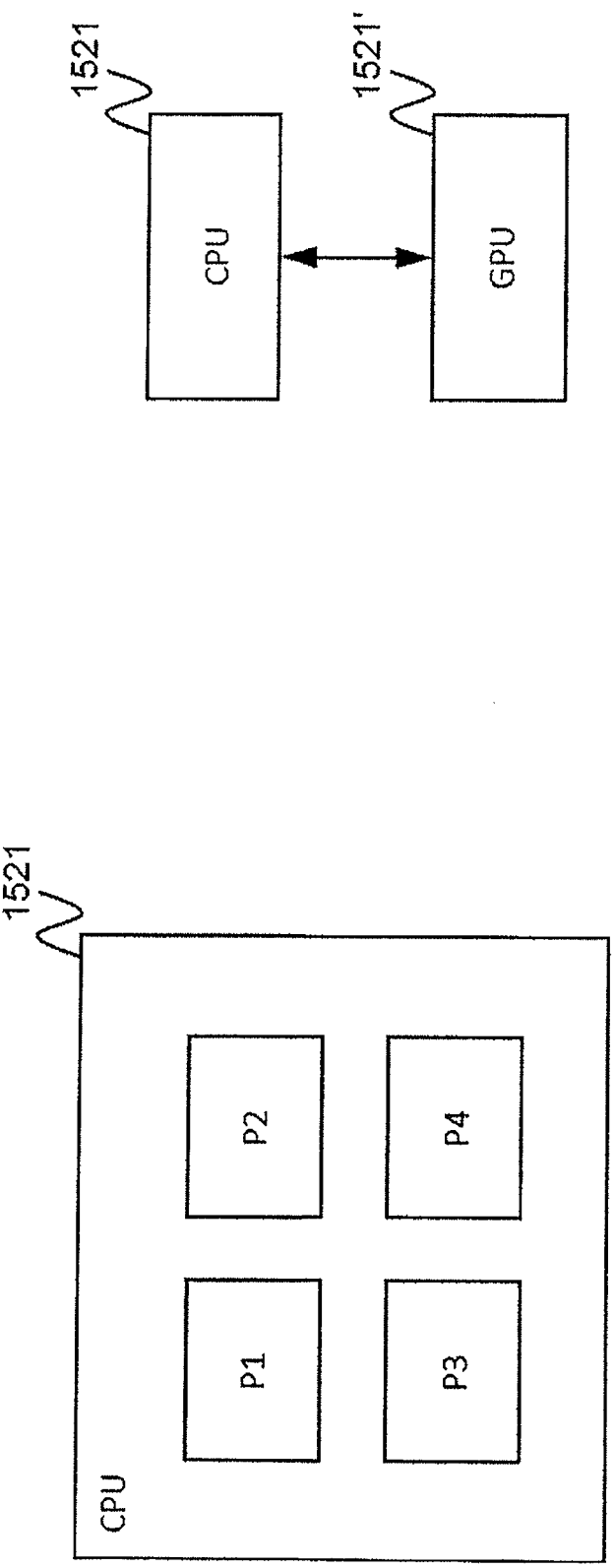

LOW LATENCY DISTRIBUTED AGGREGATION FOR CONTACT CENTER AGENT-GROUPS ON SLIDING INTERVAL

CROSS REFERENCE TO RELATED APPLICATIONS

This application claims priority to and the benefit of U.S. Provisional Application No. 61/805,513, entitled "LOW LATENCY DISTRIBUTED AGGREGATION FOR CONTACT CENTER AGENT-GROUPS ON SLIDING INTERVAL," filed on Mar. 26, 2013, the entire content of which is incorporated herein by reference.

FIELD

Aspects of embodiments of the present invention relate to systems and methods of processing large amounts of data in real time using distributed aggregation algorithms, and more specifically, to processing the data for contact center agent groups.

BACKGROUND

There is a rapidly growing need to process large amounts of data in real-time in such areas as telecommunications, finance, etc. For example, in customer contact centers, agent-groups can be large, each divided into several subsets of agents with statistics being acquired for each subset and then aggregated for the entire agent group. The statistics across multiple subsets of agents may need to be continuously tracked and updated. This real-time computing processing can present challenges to system designers, for example, in providing up-to-the minute statistical data that is both timely and accurate.

SUMMARY

Embodiments of the present invention are directed to systems and methods of processing large amounts of data in real time using distributed aggregation algorithms. Further embodiments of the present invention are directed to systems and methods of processing large amounts of data in real time using distributed aggregation algorithms on a growing interval. Still further embodiments of the present invention are directed to systems and methods of processing large amounts of data in real time using distributed aggregation algorithms on a sliding interval.

Additional embodiments of the present invention are directed to low latency systems and methods of processing large amounts of data in real time using distributed aggregation algorithms on a sliding interval. In one embodiment, as soon as the data becomes available, it immediately becomes visible to monitoring or reporting programs, or other clients of the data. In one embodiment, aggregate partial records for the sliding interval are collected asynchronously and become reflected in a total aggregate immediately, thus providing much lower latency.

According to an embodiment of the present invention, a method for aggregating and reporting data from a plurality of data sources in a contact center is provided. The method includes: maintaining by a computer device the data for a sliding interval including a plurality of panes, the data including an ongoing component for ongoing events and a completed component for completed events; updating by the computer device the data for the sliding interval based on updates for the sliding interval received from one or more of the data sources; and reporting by the computer device an aggregation of the ongoing and completed components of the data sources for the sliding interval to a client in accordance with an expiring of one of the panes.

The method may further include refreshing by the computer device the ongoing component in accordance with the expiring of the one of the panes.

The refreshing of the ongoing component may include incrementing by the computer device the ongoing component for one or more of the ongoing events in accordance with a length of the expired one of the panes.

The maintaining of the data for the sliding interval may include maintaining by the computer device the ongoing and completed components for each of the panes.

The method may further include upon the expiring of the one of the panes, creating by the computer device a new one of the panes, resetting by the computer device the completed component of the new one of the panes, and transferring by the computer device current data of one or more of the ongoing events from the ongoing component of the expired one of the panes to the ongoing component of the new one of the panes.

Each of the updates may include ongoing and completed components for one of the panes from one of the data sources. For each update of the updates, the updating of the data for the sliding interval may include aggregating by the computer device the ongoing and completed components of the update into the ongoing and completed components of the one of the panes.

The reporting of the aggregation of the ongoing and completed components of the data sources for the sliding interval may include aggregating by the computer device the ongoing and completed components across all of the panes.

Each of the updates may include ongoing and completed components for one of the panes from one of the data sources.

The method may further include transferring by the computer device current data of one of the ongoing events from the ongoing component to the completed component when the one of the ongoing events completes.

The reporting of the aggregation of the ongoing and completed components of the data sources for the sliding interval may include aggregating by the computer device the ongoing and completed components into a single component.

According to another embodiment of the present invention, a system for aggregating and reporting data from a plurality of data sources in a contact center is provided. The system includes a processor and a non-transitory physical medium. The medium has instructions stored thereon that, when executed by the processor, causes the processor to: maintain the data for a sliding interval including a plurality of panes, the data including an ongoing component for ongoing events and a completed component for completed events; update the data for the sliding interval based on updates for the sliding interval received from one or more of the data sources; and report an aggregation of the ongoing and completed components of the data sources for the sliding interval to a client in accordance with an expiring of one of the panes.

The instructions, when executed by the processor, may further cause the processor to refresh the ongoing component in accordance with the expiring of the one of the panes.

The refreshing of the ongoing component may include incrementing by the processor the ongoing component for one or more of the ongoing events in accordance with a length of the expired one of the panes.

The maintaining of the data for the sliding interval may include maintaining by the processor the ongoing and completed components for each of the panes.

Upon the expiring of the one of the panes, the instructions, when executed by the processor, may further cause the processor to create a new one of the panes, reset the completed component of the new one of the panes, and transfer current data of one or more of the ongoing events from the ongoing component of the expired one of the panes to the ongoing component of the new one of the panes.

Each of the updates may include ongoing and completed components for one of the panes from one of the data sources. For each update of the updates, the updating of the data for the sliding interval may include aggregating by the processor the ongoing and completed components of the update into the ongoing and completed components of the one of the panes.

The reporting of the aggregation of the ongoing and completed components of the data sources for the sliding interval may include aggregating by the processor the ongoing and completed components across all of the panes.

Each of the updates may include ongoing and completed components for one of the panes from one of the data sources.

The instructions, when executed by the processor, may further cause the processor to transfer current data of one of the ongoing events from the ongoing component to the completed component when the one of the ongoing events completes.

The reporting of the aggregation of the ongoing and completed components of the data sources for the sliding interval may include aggregating by the processor the ongoing and completed components into a single component.

BRIEF DESCRIPTION OF THE DRAWINGS

The accompanying drawings, together with the specification, illustrate embodiments of the present invention. These drawings, together with the description, serve to better explain aspects and principles of the present invention.

FIG. 2 is a block diagram of a logical arrangement of various entities involved in aggregating and reporting a distributed aggregation statistic for a contact center, according to an embodiment of the present invention.

FIG. 3A is a graphical representation of the aggregation of a statistic over a growing interval across one coordinator node and three slave nodes, according to an embodiment of the present invention.

FIGS. 6A and 6B are more detailed flow diagrams of steps executed by the coordinator node for processing an updated partial aggregate of the distributed aggregation statistic on the growing interval received from a slave node according to an embodiment of the present invention.

FIG. 12 illustrates some aggregation operations for processing a distributed aggregation statistic for a contact center over a sliding interval with low latency, according to one embodiment of the present invention.

FIG. 13 illustrates some pane operations for processing a distributed aggregation statistic for a contact center over a sliding interval with low latency, according to one embodiment of the present invention.

FIG. 19C is a block diagram of a computing device according to an embodiment of the present invention.

FIG. 19D is a block diagram of a computing device according to an embodiment of the present invention.

DETAILED DESCRIPTION

Figure 1:
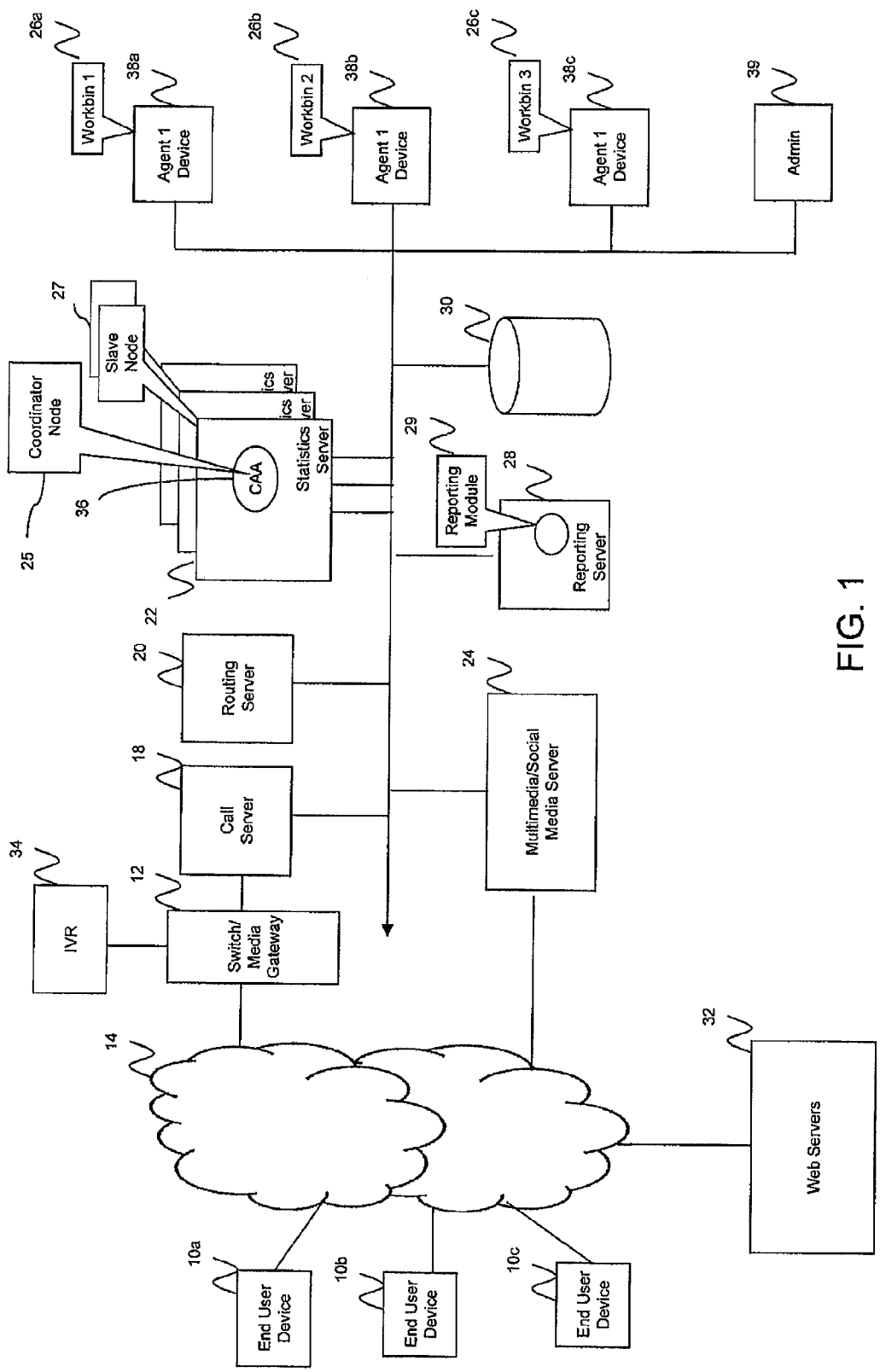
FIG. 1 is a schematic block diagram of a system supporting a contact center that is configured to provide customer availability information to customer service agents according to one embodiment of the invention.

Embodiments of the present invention will now be described with reference to the accompanying drawings.

Embodiments of the invention are directed to aggregating large amounts of data in a distributed computing environment, for example, a computing environment supporting a contact center. Certain statistics, hereinafter referred to as distributed aggregation statistics, are generated and aggregated (e.g., accumulated) over, for example, an entire contact center. Examples of distributed aggregation statistics include COUNT (incrementing a counter), SUM (computing a sum), MIN (returning the minimum value), MAX (returning the maximum value) and (bitwise) logical operations (such as AND OR). A single node in charge of this aggregation may get overwhelmed if, for example, it has too many data sources to manage, or it receives too many updates in a small period of time. For instance, a brute-force approach might be to collect all the data in some centralized storage (such as a database), and then query it with delay (the longer the delay, the higher the consistency of the data, but the lower the availability).

Accordingly, the management of distributed aggregation statistics can be partitioned into a set of partial aggregates, each partial aggregate being assigned to a different node (e.g., a slave node). The partial aggregates can then be combined into a final aggregate at a single node (e.g. a coordinator node), without overwhelming the coordinator node with too many data sources to manage, or with too many updates to perform in a small period of time.

Contact centers may want to track numerous statistics, for example, statistics related to agent performance and contact center activity. Many of these statistics are distributed aggregation statistics, such as the number of calls handled by the agents. Such statistics are frequently monitored on a growing interval, that is, a period of time, such as 24 hours, that may have a set starting point and ending point (for example, a predefined starting point and ending point). The interval may be reset at a particular time (such as every midnight), depending on factors such as the requirements of monitoring or reporting programs (or other clients) interested in the statistics, or the length of time of the interval. The intervals can be short (such as 5 minutes), or long (such as 24 hours).

The intervals may also vary in length (for example, according to a schedule, such as a predefined schedule, or stopping and starting at the request of an outside source, such as an administrator or client). According to one embodiment, a continuous aggregation (like a steady sum) taking place since a previous reset point may be referred to as a growing interval. After a reset point, which will hereinafter also be referred to as a boundary, a new interval begins. A boundary thus demarks a period of time (for example, a fixed period of time) when two intervals (referred to hereinafter as a current interval and a next interval) may be actively processed. This period of time will hereinafter be referred to as a boundary period. For the sake of simplicity, the boundary period will be described as being much smaller than the interval length. Between the end of the boundary period and the next boundary, only one interval is being actively processed (referred to hereinafter as the current interval).

For other such statistics, it may be desired to monitor them on a sliding interval (also referred to as a sliding window or window), for example, the last 24 hours. According to one embodiment, a sliding window represents a fixed amount of time W (such as five minutes or 24 hours) relative to a current time. A sliding interval statistic according to this embodiment thus represents the same amount of time (a window size) at any point, as opposed to a growing interval statistic, which represents a growing amount of time until a next interval boundary. That is, a sliding interval has a start time and an end time that slide, as opposed to a growing interval, which has a fixed start time and continues to grow until it reaches its end time. Unlike a growing interval, a sliding interval may not have a reset time (such as a fixed reset time). According to one embodiment, a continuous aggregation (like a steady sum) taking place over the last period of time W may be referred to as a sliding interval.

According to one embodiment, each event contributing to the aggregation is collected as a separate tuple, which may include information (e.g., one or more fields, each amenable to aggregation) such as an individual event (for example, a call, the number of minutes for a call) and a time stamp of when the event took place. The tuples may then be aggregated at a central place, and sliding window statistics computed by aggregating the tuples over the desired sliding window period into one final aggregate. The number of tuples, however, is potentially boundless which may lead to scaling problems for both the storage of the tuples as well as the corresponding aggregation calculations. Maintaining a continuously updated sliding interval statistic over perhaps thousands of agents in a contact center using a pure tuple-based approach may thus represent a computationally impractical or infeasible task.

One practical alternative to pure tuples for sliding interval aggregation statistics is to break up a sliding interval (window) into a fixed set of N nonoverlapping contiguous panes, each of the N panes having a starting time and ending time (much like a growing interval), the ending time of one pane coinciding with the starting time of a next pane. For instance, each pane may represent a period of time of length $P=W/N$, starting relative to a common starting point (such as every hour on the hour for the previous 24 hours, or every 5 seconds on each multiple of 5 seconds for the previous 5 minutes).

Statistics for individual panes may then be aggregated similar to aggregating over growing intervals (e.g., doing some aggregation at an individual node level, and some of the aggregation at a coordinator node level), while the statistic for the sliding interval may represent the aggregation of N consecutive such panes. For ease of description, sliding intervals are described as having a fixed length W (such as 24 hours), a fixed number N of nonoverlapping panes (such as 24), where each such pane represents the same amount $P=W/N$ of time, and starting on a multiple of the amount of time (such as every hour). The scope of the present invention, however, is not limited to these restrictions, and in some embodiments, these values may vary as would be apparent to one of ordinary skill in the art.

According to one or more embodiments, a sliding interval has boundaries at the individual panes. Accordingly, sliding intervals are represented as N contiguous panes, with consecutive sliding intervals overlapping in N−1 of these panes. One sliding interval becomes a next sliding interval by dropping its oldest pane and adding a newest pane. Sliding intervals are thus amenable to queue-like data structures (e.g., matrices, circular lists, etc.) for managing their individual component panes.

In addition, the pane size P of the sliding interval (e.g., the length of time of each pane, which represents how precisely the sliding interval represents the previous period of time W) may be changed by adjusting the number N of panes. For instance, doubling the number N of panes (such as 48 instead of 24) halves the pane size P (to, for example, 30 minutes) at the expense of potentially doubling the amount of storage needed to maintain the partial aggregates for the individual panes as well as potentially doubling the computation time to aggregate all the partial aggregates into a total aggregate over the entire sliding window. The granularity P can thus be adjusted depending on, for example, needs of a client or administrator for timeliness of data versus appropriate computing resources to maintain the granularity.

According to an embodiment, panes are grouped into rings, where each ring represents a group of G panes (for example, G consecutive panes, such as 6 consecutive panes). This allows a better balancing of the computational complexity of sliding interval aggregation statistics across multiple levels of nodes. According to this embodiment, the ring size R is G×P, and the number of rings M in a sliding window is W/R. This allows, for example, slave nodes to perform aggregation at the ring level by aggregating statistics over G consecutive panes representing one ring, while a coordinator node aggregates statistics over M consecutive rings representing one window. For ease of description, rings are described as if they contain G consecutive panes. As such, rings function much like small sliding intervals (having G panes instead of N panes), so analogous terms for describing sliding intervals are also used to describe rings.

Although some embodiments are described as organizing consecutive panes into rings and consecutive rings into sliding intervals, design decisions such as the use of rings, their corresponding sizes, and whether they represent consecutive panes may vary between embodiments of the present invention. Still further embodiments may be directed to multiple levels of rings to process the aggregation.

One alternative to rings representing contiguous panes is for rings to represent evenly spaced panes. For example, in one embodiment, each ring in a sliding window represents every Mth pane in the sliding window. Thus, there are still M rings in the sliding window, but their panes are interleaved across the sliding window. These rings can still be thought of as contiguous, in that the panes of the first ring (i.e., the 1st pane, the (M+1)th pane, the (2M+1)th, etc.) are still contiguous to the respective panes of the second ring (i.e., the 2nd pane, the (M+2)th pane, the (2M+2)th pane, etc.) and so on for the third and later rings. In addition, the extension of the above concepts to even further levels of grouping (i.e., beyond rings) within the sliding interval is not expressly discussed herein, but would be apparent to one of ordinary skill in the art using similar principles used herein to describe panes and rings.

Clients, such as reporting programs, monitor these growing interval and sliding interval statistics, often in real time. As such, these statistics may need to have high availability, reflecting the most recent update. Thus, according to an embodiment of the present invention, a contact center statistic, such as the number of calls handled by an agent-group (i.e., a group of agents, perhaps thousands of agents), can be efficiently managed with high availability by partitioning the agent-group into several subsets of agents, each subset being assigned to and managed by a particular slave node. The slave nodes handle the updates for each of their corresponding agents, computing their own partial aggregates in the process. The slave nodes then send these partial aggregates to the coordinator node (that may also manage a subset of agents), which maintains a running aggregate for all the partial aggregates. According to one embodiment, the coordinator node is configured to report any updated aggregate of the statistic to interested clients with high availability.

However, in a growing interval, when an interval boundary is crossed, and one interval expires while another interval starts (that is, during the boundary period), the statistic may experience consistency issues (e.g., concurrently processing updates for both the current interval and the next interval). According to one embodiment, availability may be favored over consistency within the growing interval, and the updated aggregate may be reported to clients on every update, even if it means mixing partial aggregates whose corresponding data sources are not tightly synchronized. Once an interval completes (i.e., the boundary is crossed), the different agents, nodes, or the like finish processing the current interval, provide any final updates, and move onto the next interval (e.g., providing partial aggregates for this new interval).

Likewise, for a sliding interval, when a pane boundary is crossed, similar consistency issues may present themselves. The just-completed pane (or panes) may still have updates being reported to the coordinator node. Thus, while waiting to report such statistics improves the consistency (allowing straggling updates to reach the coordinator node), it does so at the expense of availability (e.g., the administrator or client interested in the sliding interval statistic may be reported values that do not reflect the latest updates).

To maintain consistency, the aggregate for the statistic is configured to reflect data from the same interval. The final aggregate for a growing interval (such as total customer call count for the day) is often an important value of the statistic but may not be fully accounted for until the boundary period. According to one embodiment, consistency is favored during the boundary period, and the reporting of the statistic to an interested client is withheld until all of the nodes have reported their final partial aggregates for the current interval and the coordinator node has had a chance to process them. During this boundary period, the aggregating of partial aggregates for the next interval starts. After reporting the final aggregate (i.e., after the boundary period), processing switches completely to the next interval (which becomes the new current interval), and the process repeats.

In a similar fashion, for a sliding interval statistic can have parameters, such as the pane size P and number of delay panes D, for controlling between consistency and availability. Setting the pane size small (such as a few seconds) improves the granularity of reporting, allowing the sliding window (as implemented by a fixed set of contiguous panes) to more accurately represent the period corresponding to the previous W amount of time. The number of delay panes D, in turn, represents a delay (in panes) between the most recent pane for which data has been collected and the most recent pane for reporting aggregated statistics over the sliding interval. When D=0, there is no delay (and thus, some panes, like the most recent pane, may not reflect all their updates), while for positive values of D, a corresponding amount of delay (such as 6 seconds, e.g., when the pane size P is 3 seconds and the number of delay panes D is 2) is built into the global aggregate to allow stray updates to make their way to the coordinator node.

In another embodiment of the sliding interval statistic, aggregate partial records are collected asynchronously and become reflected in the total aggregate immediately, thus providing much lower latency. Under such an approach, as soon as the data becomes available, it immediately becomes visible to the clients. Here, events may be thought of as current or ongoing, that is, continuing to accumulate statistical information (such as number of seconds for an ongoing call, or number of times put on hold or transferred to another agent for an ongoing call), or completed or historical (such as completed calls or transactions). While the event is ongoing, partial updates are continuously taking place, so care must be exercised in accounting for the updates (so that the statistics over the sliding window stay accurate and current) until the event completes, at which point the statistics can be entered in a more concrete form.

FIG. 1 is a schematic block diagram of a system supporting a contact center that is configured to provide customer availability information to customer service agents according to one embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third party service provider, and/or hosted in a remote computing environment such as, for example, a private or public cloud environment with infrastructure for supporting multiple contact centers for multiple enterprises.

According to one embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as end user devices 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet -sourced calls and/or telephone network-sourced calls. According to one embodiment of the invention, the switch is coupled to a call server 18 which may, for example, serve as an adapter or interface between the switch and the remainder of the routing, monitoring, and other call -handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18, which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such an agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as agent device 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22 (or a plurality of statistics servers 22).

The system may also include one or more administrator devices (or administrator/agent devices) 39. The administrator device 39 may be configured to supervise the agent devices 38, make requests of the contact center, such as requests for statistics, and the like.

According to one embodiment, each of the plurality of statistics servers 22 includes a customer availability aggregation (CAA) module 36 (or aggregation module 36) for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22, and which program instructions are executed by a processor. A person of skill in the art should recognize that the aggregation module 36 may also be implemented via firmware (e.g. an application-specific integrated circuit), hardware, or a combination of software, firmware, and hardware.

One such CAA module 36 in FIG. 1 is designated as a coordinator node 25. The coordinator node 25 is configured to aggregate statistics from one or more other CAA modules 36 designated as slave nodes 27. It should be noted that there does not need to be a one-to-one relationship between the nodes 25 and 27 and the statistics servers 22. For example, in one embodiment, the coordinator node 25 and the slave nodes 27 all reside on the same statistics server 22. In addition, the nodes 25 and 27 may be able to move between statistics servers 22.

According to one embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The contact center may also include a reporting server 28 configured to generate reports from data aggregated by the statistics server 22. The reporting server 28 may include a reporting module 29 for performing this reporting. The reporting module 29 may be a software module implemented via computer program instructions that are stored in a memory of the reporting server 28, the program instructions being executed by a processor. The reports generated by the reporting module may include near real-time reports or historical reports concerning the state of resources, such as, for example, average waiting time, abandonment rate, agent occupancy, and the like. The reports may be generated automatically or in response to specific requests from a requestor, e.g., agent/administrator (such as from administrator device 39), contact center application, and/or the like.

According to one embodiment of the invention, the contact center also includes a mass storage device 30 for storing data related to contact center operations such as, for example, information related to agents, customers, customer interactions, and the like. The mass storage device may take the form of a hard disk or disk array as is conventional in the art. The data may be organized (for example, as a database) and managed by a separate server (such as a database server) as is known to one of ordinary skill in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. In addition, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Each of the various servers, controllers, switches, gateways, engines, and/or modules (collectively referred to as servers) in the afore-described figures may be a process or thread, running on one or more processors, in one or more computing devices 1500 (e.g., FIG. 19A, FIG. 19B), executing computer program instructions and interacting with other system components for performing the various functionalities described herein. The computer program instructions are stored in a memory, which may be implemented, in a computing device using a standard memory device, such as, for example, a random access memory (RAM). The computer program instructions may also be stored in other non-transitory computer readable media such as, for example, a CD-ROM, flash drive, or the like. In addition, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 19A:
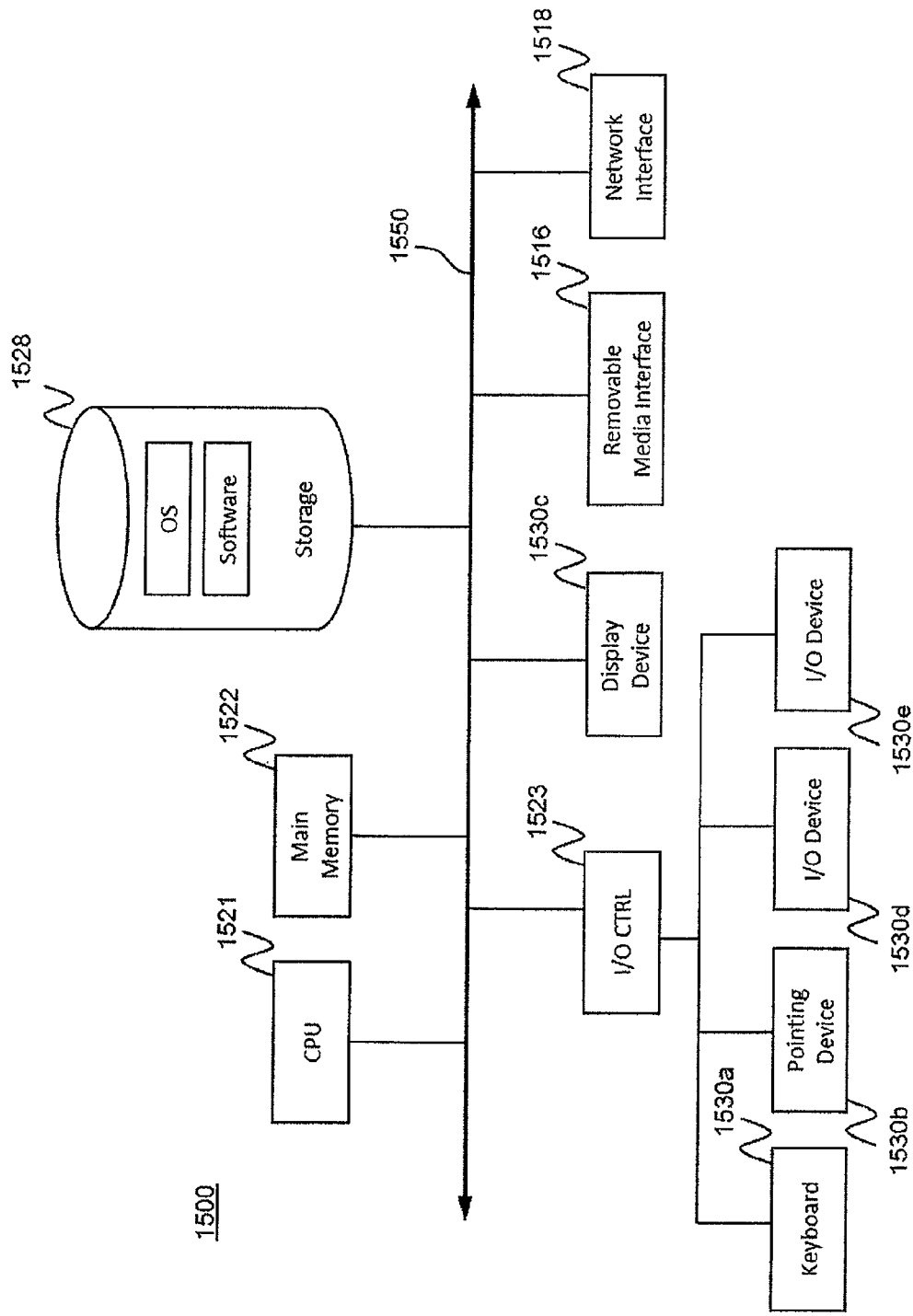
FIG. 19A is a block diagram of a computing device according to an embodiment of the present invention.
Figure 19B:
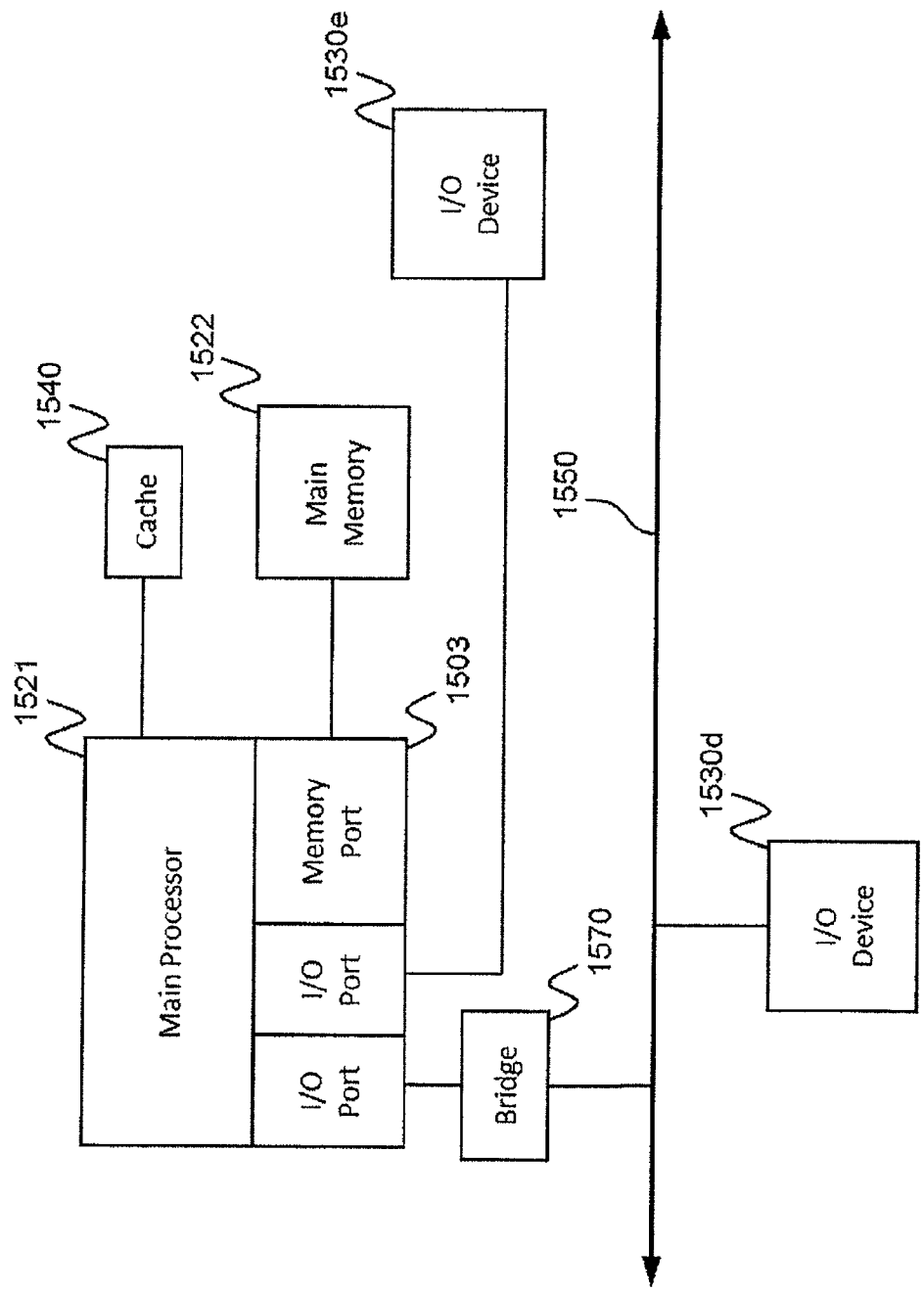
FIG. 19B is a block diagram of a computing device according to an embodiment of the present invention.

FIG. 19A and FIG. 19B depict block diagrams of a computing device 1500 as may be employed in exemplary embodiments of the present invention. Each computing device 1500 includes a central processing unit 1521 and a main memory unit 1522. As shown in FIG. 19A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 19B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 19A, the central processing unit 1521 communicates with the main memory 1522 via a system bus 1550. As shown in FIG. 19B, the central processing unit 1521 may also communicate directly with the main memory 1522 via a memory port 1503.

FIG. 19B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 19A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 19B depicts an embodiment of a computer 1500 in which the central processing unit 1521 communicates directly with I/O device 1530e. FIG. 19B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 19A, may control the I/O devices. The I/O controller may control one or more I/O devices such as a keyboard 1530a and a pointing device 1530b, e.g., a mouse or optical pen.

Referring again to FIG. 19A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 19A and FIG. 19B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

As shown in FIG. 19C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory that is shared and some memory that may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 19D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 19E:
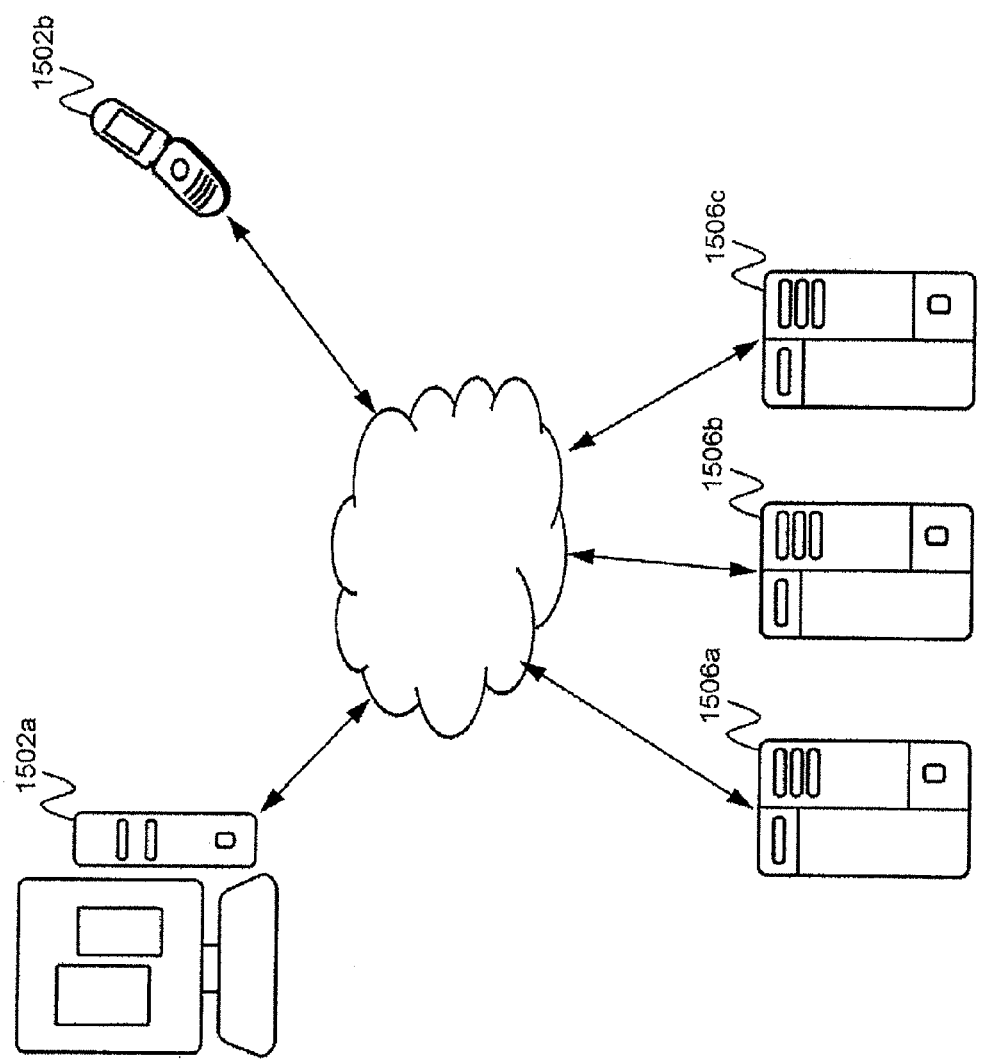
FIG. 19E is a block diagram of a network environment including several computing devices according to an embodiment of the present invention.

A computing device may be one of a plurality of machines connected by a network, or it may comprise a plurality of machines so connected. FIG. 19E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 19E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 19E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

FIG. 2 is a block diagram of a logical arrangement 200 of various entities involved in the aggregating and reporting of a distributed aggregation statistic for a contact center, according to an embodiment of the present invention.

In the arrangement 200, distributed aggregation statistics emanate from agents of the contact center, such as agents 210, 212, 214, 216, and 218, who may be part of a large agent-group. For example, one such distributed aggregation statistic is the number of calls handled by a particular agent. This statistic may be aggregated across the entire agent-group over, for example, a 24-hour period, at a coordinator node 250, which may be similar to the coordinator node 25 of FIG. 1. The coordinator node 250 may be configured to report the running aggregate to interested clients 260 and 270 (such as the reporting modules 29 or administrators 39 of FIG. 1).

If the client 260, 270 would like the statistic to have high availability, such as reflecting the most recent update to the statistic, the coordinator node 250 may recompute a running aggregate for each update received from one of the agents. However, since agent-groups can potentially get very large (e.g., thousands of agents), the coordinator node 250 can become a serial bottleneck if it has to maintain running aggregates of the statistic from each of the individual agents as well as report updated running aggregates to the interested clients 260, 270 every time one of the agents sends a new update.

In efforts to address the bottleneck issue, the agent group may be partitioned into non-overlapping subsets of agents, and each of these subsets may be assigned to a particular slave node, such as slave nodes 220, 230, and 240, which may be similar to the slave nodes 27 of FIG. 1. The assignment may be based on a variety of factors, such as a relationship between the agents of a particular subset, an even balancing of agents or agent workloads across the subsets, or the like. In the example of FIG. 2, agents 210 and 212 are assigned to slave node 220, agent 214 is assigned to slave node 230, and agents 216 and 218 are assigned to slave node 240.

Each agent may keep track (e.g., a partial aggregate) of the statistic as it applies to the particular agent, and then send an update of the partial aggregate to a corresponding slave node, which will generally be referred to as slave node 220. It should be noted that the term "agent" in this context (and similar contexts in the present application) is also meant to encompass the agent's computer or other automated or electronic resources working on behalf of or dedicated to the agent. Rather than maintaining individual partial aggregates, however, in some embodiments, an agent reports any update to the statistic to its corresponding slave node 220.

Each slave node 220 in turn manages the updates from each of its assigned agents, and maintains a partial aggregate (e.g., a running partial aggregate) of the statistic over the entire subset of agents assigned to the slave node 220 for the current interval (in a growing interval statistic) or the current pane (in a sliding interval statistic). Upon receiving an update from one of its agents, the slave node 220, 230, 240 can update the partial aggregate for its subset of agents and forward this update to the coordinator node 250. Thus, for ease of description, in the embodiments described hereinafter, agents are not affected by intervals, panes, or boundaries, while slave nodes 220, 230, 240 switch quickly from one interval or pane to the next at the boundary. That is, in one embodiment, the slave nodes 220, 230, 240 maintain one partial aggregate for a growing interval statistic, reporting and resetting it soon after a boundary is crossed. For a sliding interval statistic, the slave nodes 220, 230, 240 maintain, according to one embodiment, G partial aggregates, one for each of G panes in a ring.

The coordinator node 250 may manage the partial aggregates (also referred to as partial state records, or PSRs) for the slave nodes 220, 230, 240, and/or the PSRs of rings or panes (for sliding interval statistics). In addition, the coordinator node 250 may also have a subset of individual agents assigned to it that it manages (similar to how the slave nodes 220, 230, 240 manage their subsets) in addition to managing the slave nodes 220, 230, 240. That is, the coordinator node 250 may have a dual role of both a slave node and a coordinator node for each of the slave nodes. Upon receiving an update from one of the slave nodes 220, the coordinator node 250 updates the running aggregate it maintains and may report the updated aggregate to the clients 260 and 270.

According to one embodiment, nodes (such as slave nodes 220, 230, and 240 as well as coordinator node 250) are logical entities, such as processes on a server. They communicate between themselves via, for example, a network (for distributed processes), or shared memory (for processes running on the same server), as is well known to one of ordinary skill. The choice of which node is a coordinator node and which nodes are slave nodes can vary between embodiments, and may be based on such factors as load balancing (for example, having each node be a coordinator node for one statistic, and be a slave node for each of the other statistics). According to one embodiment, while the communications can be asynchronous, communications between the same pair of entities (such as between slave node 220 and the coordinator node 250) are assumed to be received in the order of sending (that is, monotonicity of sending is maintained).

While FIG. 2 shows a single level of slave nodes 220, 230, 240, in other embodiments, there may be multiple levels of slave nodes, hierarchically organized, as would be apparent to one of ordinary skill in the art. In such a configuration, the different levels of slave nodes would take on roles that may be hybrids of the slave nodes 220, 230, 240 or coordinator node 250 as described herein. For ease of explanation, however, the embodiments disclosed herein will be described in reference to having a single level of slave nodes 220, 230, 240.

The division and assignment of agents and nodes may introduce communication overhead that can lead (or further lead) to asynchronicity of data at the coordinator node level. That is, the coordinator node 250 is not guaranteed to receive updates from each of the agents or subsets of agents in the order that the updates were made at the agent level. In part, this is to produce high availability (or timeliness) of the statistic (referred to as a type I statistic). In a type I statistic, some skew between data sources is tolerated in order that the global aggregate reflects as many of the updates as possible, even if it means processing some of the updates out of order. According to one embodiment, growing interval statistics, such as some of the distributed aggregation statistics discussed herein, are assumed to be type I statistics, and their corresponding partial aggregates are updated as quickly as possible and reflected to the clients 260, 270.

Type II statistics differ from type I statistic in that they favor consistency (or accuracy) over timeliness. For type II statistics, updates sent from the coordinator node 250 to the client 260 may reflect a common time reference across various sources (e.g., common time period, such as a day or a particular hour), even if the individual agent or slave node updates for the same period arrive at the coordinator node at different times. That is, type II statistics are updated to reflect a consistent time for the various slave nodes and agents, and not necessarily the order that individual updates (for example, partial aggregates) work their way through the arrangement 200 of agents and nodes to the coordinator node 250. In a distributed system such as the arrangement 200, with asynchronous communication channels, the competing goals of availability (type I) and consistency (type II) represent a tension that may be decided, for example, by the client requesting the information or any other mechanism conventional in the art.

Embodiments of the present invention provide an aggregation system and method configured to satisfy both types of clients for distributed aggregation statistics over a growing interval. For example, during an interval (i.e., during the current interval), high availability is maintained by reflecting any update that reaches the coordinator node 250 as quickly as possible to the clients 260 and 270. At the expiration of the current interval, however, and the start of the next interval (i.e., crossing the boundary and entering the boundary period), consistency is maintained during the boundary period by not reflecting any more updates of the current interval to the client 260 (for example, not reporting any more global aggregates to the client 260) until the last such update is received by the coordinator node 250.

Rather, in one embodiment, such updates for the current interval continue to be aggregated (and not reported) at the coordinator node 250 during the boundary period. In one embodiment, the updates may be queued (for example, at the data source, slave node, aggregation service, or the like) during the boundary period until a final statistic for the growing interval is ready to be aggregated. In addition, in one embodiment, updates for the next interval are aggregated separately and not reported until the current interval reports its final aggregate (that is, not until after the boundary period), where the final aggregate is configured to reflect a consistent aggregate over, for example, the entire current interval for all of the agents. The next interval then becomes the current interval, the boundary period ends, and any partial aggregates are combined at the coordinator node 250 for reporting the running aggregate to the clients 260 and 270 in a high availability manner until the end of the (new) current interval is reached.

Embodiments of the present invention also provide an aggregation system and method configured to satisfy both types of clients for distributed aggregation statistics over a sliding interval. For example, parameters such as the pane size P and the number of delay panes D can be set to strike the appropriate balance between timeliness and consistency, with smaller values of pane size P or number of delay panes D improving the availability (type I) quality of the aggregated statistic, and larger values improving the consistency (type II) quality of the aggregated statistic over the sliding window. For example, setting the pane size P to be small, such as 3 seconds, while setting the number of delay panes D to be small, such as 0, may help create a highly available aggregate statistic (type I) that may report smaller than accurate values because it may not reflect the most recent updates.

Further embodiments of the present invention provide an aggregation system and method configured to satisfy both types of clients for distributed aggregation statistics over a sliding interval with continuous updates for ongoing statistical events. For example, pane size P can be adjusted downward (such as one or a few seconds) to accommodate availability (type I) statistics, with increased overhead to process the statistics (e.g., more frequent updating and reporting of statistics, more panes to manage). On the other hand, pane size P can be adjusted upward (e.g., tens of seconds or even minutes) to accommodate consistency (type II) statistics, with corresponding decreased overhead to process the statistics (which confers additional benefits, such as being able to track more statistics). With either approach, ongoing events are tracked across multiple panes and their corresponding statistics continuously updated to reflect their accumulated statistics, even before the events complete. Accordingly, lower latency of reporting statistics is achieved by the continual updates throughout an event's lifecycle.

FIG. 3A is a graphical representation of the aggregation of a statistic over a growing interval across one coordinator node 250 and three slave nodes 220, 230, 240 according to an embodiment of the present invention.

Referring to FIG. 3A, the current interval is labeled $I_n$, the next interval is labeled $I_{n+1}$, and the previous interval is labeled $I_{n-1}$. Consecutive intervals are separated by an interval boundary (or boundary, for short). Four separate graphs are provided as an example, one for each slave node 220, 230, 240 and one for the coordinator node 250 (which may also be aggregating the statistic with its own subset of agents, in addition to managing the three slave nodes 220, 230, 240). Each graph represents time via an x-axis that advances from left to right, and partial aggregates (for example, counts or sums) via a y-axis.

In the example graphs, the partial aggregates increment over time within the interval. For example, growing partial aggregates over the current interval $I_n$ for slave node 220 is represented via graph 310. In a similar fashion, the growing partial aggregates for slave nodes 230 and 240 are respectively represented via graphs 320 and 330. The partial aggregate for the subset of agents managed by the coordinator node 250 is represented via graph 340. Graph 350 (which includes portion 340) depicts a global aggregate (for example, sum) over all the nodes 220-250. In this example, the aggregates reflected via graphs 310-350 are reset at the boundaries between intervals, such as between $I_{n-1}$ and $I_n$, or between $I_n$ and $I_{n+1}$. Boundary periods (as shown for the coordinator node 250) represent periods of time at the completion of one interval and the early portion of the following interval where the coordinator node 250 is concurrently working on completing processing for one interval (the current interval) while starting processing for the next interval.

Figure 3B:
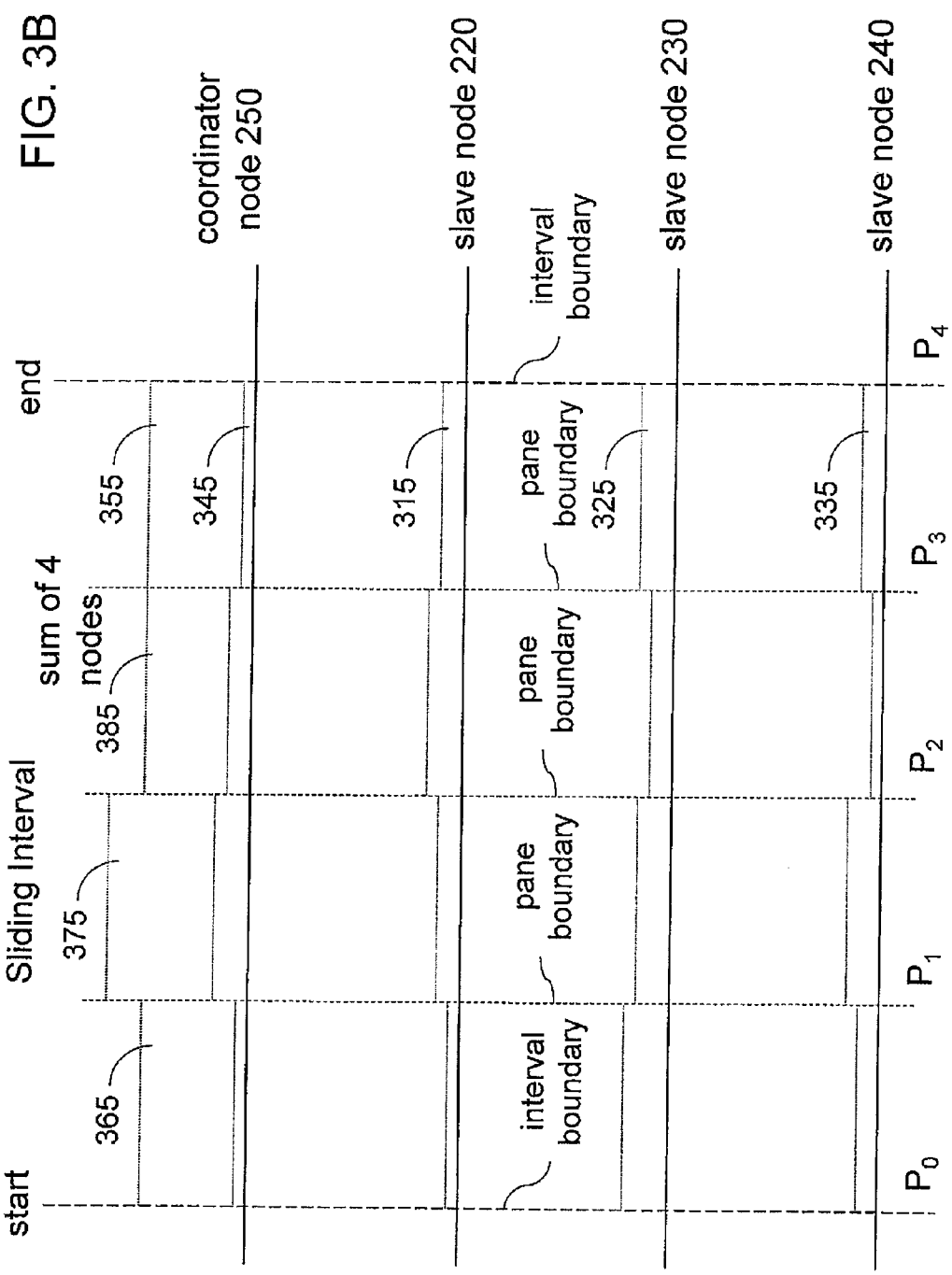
FIG. 3B is a graphical representation of the aggregation of a statistic over a sliding interval across one coordinator node and three slave nodes, according to an embodiment of the present invention.

FIG. 3B is a graphical representation of an aggregation of a statistic over a sliding interval across one coordinator node 250 and three slave nodes 220, 230, 240 according to an embodiment of the present invention.

Referring to FIG. 3B, the sliding interval in the illustrated example contains 4 panes (i.e., N=4), labeled $P_0$, $P_1$, $P_2$, and $P_3$, with a next pane labeled $P_4$. For simplicity, rings are not depicted in FIG. 3B. Four separate bar graphs are provided as an example, one for each slave node 220, 230, 240 and one for the coordinator node 250 (which may also be aggregating the statistic with its own subset of agents, in addition to managing the three slave nodes 220, 230, 240). Each bar graph represents time via an x-axis that advances from left to right, and partial aggregates (for example, counts or sums) via a y-axis.

In the example bar graphs, the partial aggregates are represented as discrete sums (bars) within each pane. For example, the partial aggregate over the pane $P_3$ for slave node 220 is represented via bar graph 315. In a similar fashion, the partial aggregates for slave nodes 230 and 240 over the same pane $P_3$ are respectively represented via bar graphs 325 and 335. The partial aggregate for the subset of agents managed by the coordinator node 250 is represented via bar graph 345. Bar graph 355 (which includes the portion 345) depicts a global aggregate (for example, sum) over all the nodes 220-250 for the pane $P_3$. In this example, the aggregates reflected via bar graphs 315-355 are reset at the boundaries between panes, such as between $P_3$ and $P_4$ or between $P_4$ and $P_5$ (not shown). Aggregates over the entire sliding interval (panes $P_0$ through $P_3$) may be obtained by aggregating the corresponding global aggregates for each of the panes $P_0$ through $P_3$, namely, bar graphs 365, 375, 385, and 355, respectively. Once time passes the pane $P_3$, the sliding interval advances one pane to the right, dropping pane $P_0$ and adding pane $P_4$.

Growing Interval

A process flow of the distributed aggregation statistics over a growing interval will now be described with reference to FIGS. 4-7. Each of the processes may be described in terms of a software routine executed by one or more processors based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 4:
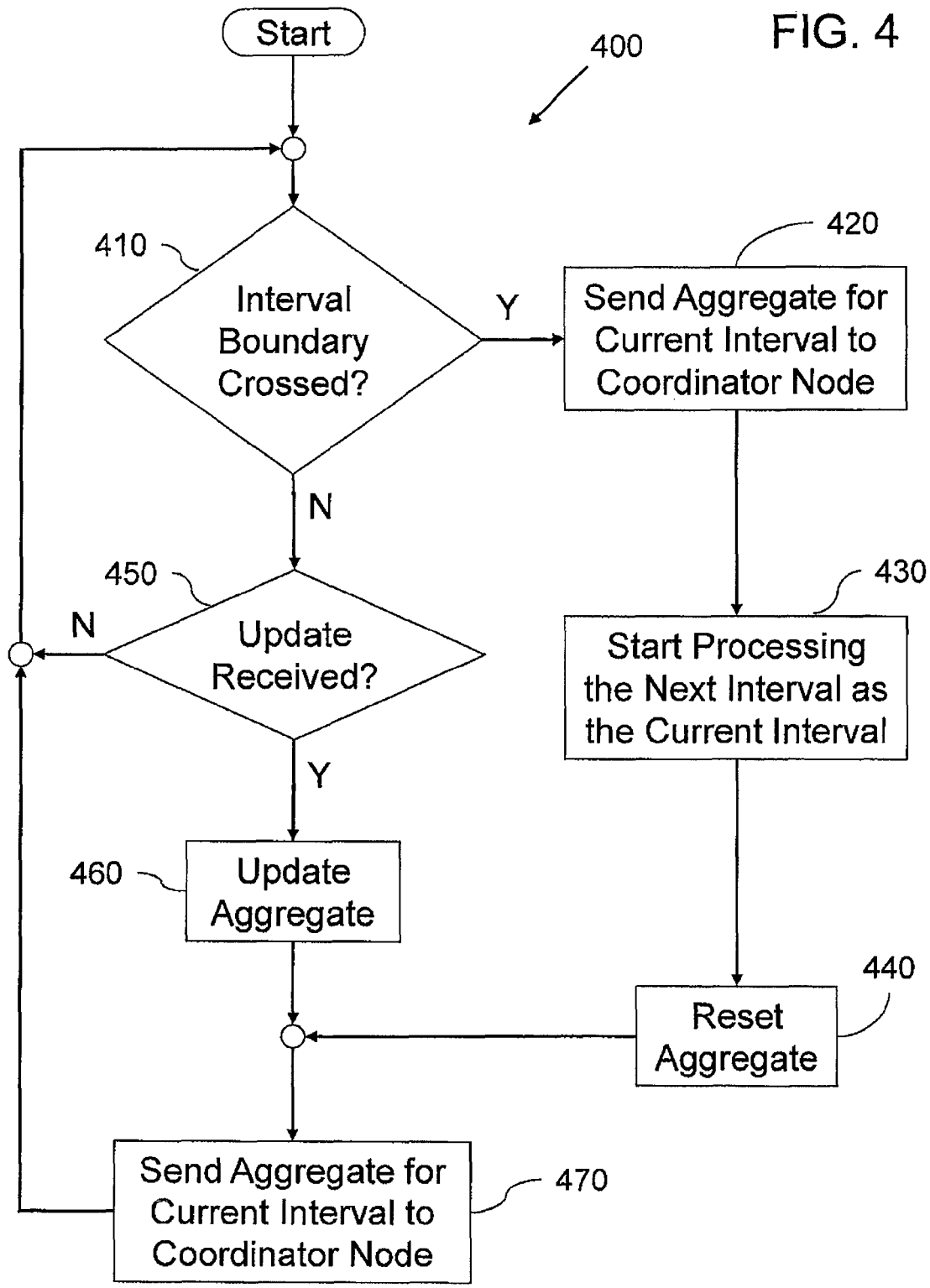
FIG. 4 is a flowchart of a process executed by a slave node for processing the distributed aggregation statistic on the growing interval according to an embodiment of the present invention.

FIG. 4 is a flowchart of a process 400 executed by the slave node 220, 230, 240 for processing the distributed aggregation statistic on the growing interval according to an embodiment of the present invention. A person of skill in the art should also recognize that the process might also be implemented by the coordinator node 250 performing the role of a slave node in addition to its role of a coordinator node 250. For ease of description, slave node 220 will described as a representative slave node.

According to one embodiment, the slave node 220 is responsible for maintaining a running, partial aggregate for the statistics that it collects over a current, growing interval corresponding to a subset of agents managed by the slave node 220. Processing begins, and in step 410, the slave node 220 determines whether an interval boundary has just been crossed, signaling the end of the current interval (e.g., no more updates are aggregated into the running partial aggregate) and the start of a boundary period. For example, the slave node 220 may receive a boundary crossed signal at a consistent time (such as at midnight), and the receipt of the signal may be an indication to the slave node 220 that it should conclude processing for the current interval and switch processing to the next interval. For instance, in one embodiment, the coordinator node 250 may send such a signal, while in another embodiment, a timer (such as a global timer) may trigger the signal.

According to one embodiment, crossing an interval boundary causes any new updates from the agents to be aggregated into a next interval. However, existing updates whose corresponding partial aggregates may still be working their way to the coordinator node 250 are aggregated as part of a current interval. According to one embodiment, the slave node 220 crosses the boundary in step 410 only once per interval, regardless of how many times step 410 is performed.

If the slave node 220 has determined that the boundary has been crossed, the slave node 220 transmits the current interval's final aggregate to the coordinator node 250 in step 420. This allows the coordinator node 250 to see a final aggregate from the slave node 220 for the current interval.

In step 430, the slave node 220 sets the next interval to be the current interval (i.e., starts processing the next interval as the current interval). Thus, subsequent updates received from the agents are aggregated into the next interval. In one embodiment, the nodes identify each interval uniquely (i.e., an interval identifier), such as with a date or time stamp, or with a counter incrementing from zero. This allows updates for a statistic to be tied to the correct interval (e.g., to keep the global aggregate consistent). Step 430 can also serve as an entry point for an initialization routine for the slave node 220, where the slave node 220 initializes the current interval. For example, the slave node 220 may set the current interval (e.g., interval identifier) to the current date or time, or set it to zero.

In step 440, the slave node 220 resets its running partial aggregate for the current interval (for example, the slave node 220 may set the running partial aggregate to NULL, indicating an empty aggregate). In step 470, the slave node 220 sends its reset (e.g., NULL) aggregate to the coordinator node 250. The interval identifier associated with the transmitted aggregate is for the next interval, signaling to the coordinator node 250 that the slave node 220 is finished transmitting updates for the current interval, and has started transmitting updates for the next interval. Processing then repeats, starting with step 410, checking for boundary crossing (i.e., of the next interval).

If, on the other hand, in step 410, the slave node 220 has determined that the interval boundary has not been crossed, processing proceeds to step 450, where the slave node 220 checks to see if it has received an update from any of its agents. For ease of description, in the slave node routine 400, the updates from the agents are described as being simple values, not aggregates. If no update has been received, the slave node 220 loops back to step 410 for determining whether the interval boundary has been crossed.

If the slave node 220 has received an update from one of its agents, processing proceeds to step 460, where the slave node 220 updates the running partial aggregate for the current interval with the new value from the agent. The new value may be, for example, a count request (i.e., increment a counter by one, as might happen when the agent completes a call), or a number (e.g., a number of minutes of the just completed call by the agent).

In step 470, the slave node 220 sends the updated partial aggregate for the current interval to the coordinator node 250. According to one embodiment, the partial aggregate includes a count (such as a call count), or a running sum (such as a running total of the number of minutes for the calls), or the maximum length of a call, or the like. The slave node 220 may send the interval identifier with the partial aggregate (e.g., to keep it consistently aggregated at the coordinator node 250 with other data from the same interval). In this manner, updates are reported with high availability, specifically, an updated partial aggregate is reported to the coordinator node 250 as soon as the update is received from an agent. Processing then repeats, starting with step 410, checking for interval boundary crossing.

Figure 5:
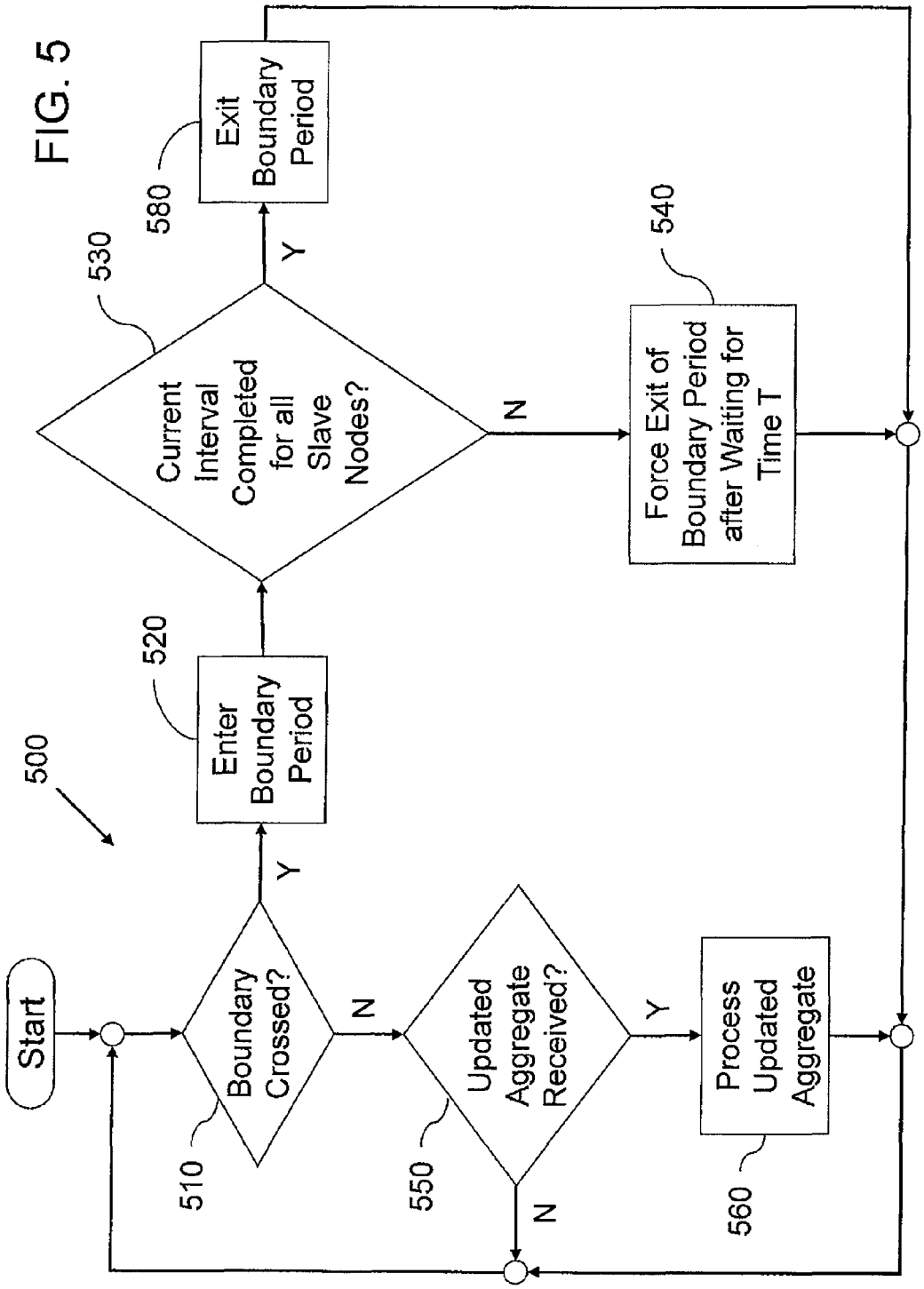
FIG. 5 is a flowchart of a process executed by the coordinator node for processing the distributed aggregation statistic on the growing interval according to an embodiment of the present invention.

FIG. 5 is a flowchart of a process 500 executed by the coordinator node 250 for processing the distributed aggregation statistic on the growing interval according to an embodiment of the present invention. According to one embodiment, the coordinator node 250 is responsible for maintaining a running partial aggregate for a particular statistic over a current, growing interval for each of the slave nodes 220, 230, 240 (as well as for the coordinator node 250, if it is also acting as a slave node). For ease of description, the process 500 depicts the coordinator node's 250 role as coordinating all of the partial aggregates, and not the possible additional role as another slave node. In addition, an individual slave node will be described in reference to slave node 220, while the group of slave nodes will be described in reference to slave nodes 220, 230, 240. In a similar fashion, an individual client will be described in reference to client 260, while the group of clients will be described in reference to clients 260, 270.

Processing begins and in step 510, the coordinator node 250 determines whether a current interval boundary has been crossed and thus, a boundary period has been entered. According to one embodiment, the crossing of a boundary signals the coordinator node 250 that the boundary period has been entered, and that a final aggregate for the current interval should be determined and forwarded to the clients 260, 270.

In one embodiment, the coordinator node 250 maintains partial state records (e.g., partial aggregates of the statistic) for each of the slave nodes 220, 230, 240 (and the coordinator node 250, if also functioning as a slave node), for both the current and next intervals. During the boundary period, partial aggregate updates for the current interval may continue to be received and processed by the coordinator node 250. In addition, each slave node 220 may send a final updated partial aggregate for its subset of agents when it crosses the interval boundary. Accordingly, the coordinator node 250 may be required to process running partial aggregates from the slave nodes 220, 230, 240 over both the current interval and the next interval during the boundary period.

In step 510, if the current interval has expired, processing proceeds to step 520, where some indication is made (such as setting a boundary period flag) that the boundary period has been entered, but not completed. In one embodiment, in response to entering the boundary period, further reporting of updated running aggregates of the statistic to the clients 260, 270 is suspended until a final aggregate for the current interval is accounted for and reported to the clients 260, 270, thus signifying an end of the boundary period. In this manner, consistency of the statistic is favored over availability during the boundary period. For ease of description, the remainder of the application will be described in reference to the boundary period being tracked by the coordinator node 250 using a boundary period flag that is set when the boundary period is entered and reset when the boundary period is exited.

In step 530, the coordinator node 250 checks each of the slave nodes 220, 230, 240 for completion of the current interval. According to one embodiment, a slave node 220 signals completion of a current interval by transmitting an updated partial aggregate for a next interval. Thus, the coordinator node 250 examines the interval identifier for the updated partial aggregate for determining whether it is for the current or next interval. According to one embodiment, the coordinator node 250 maintains a set of flags (current interval completed flags), one flag for each slave node 220, to track whether a slave node 220 has completed the current interval. If the coordinator node 250 determines based on the interval information associated with the received partial aggregates that each of the slave nodes 220, 230, 240 has completed its current interval processing, processing proceeds to step 580 for exiting the boundary period (e.g., resetting the current interval and making the next interval be the current interval).

Referring again to step 530, if not all of the slave nodes 220, 230, 240 have completed their processing for the current interval, processing proceeds to step 540 and a (boundary period timeout) timer is set for time T, after which a forced exiting of the boundary period takes place. T, for example, can be a set length (such as a predetermined length) of time for the boundary period. Step 540 can thus guarantee an end of the boundary period, should the boundary period not end for other reasons (such as every slave node 220, 230, 240 having started reporting partial aggregates for the next interval). The timer can be checked in any one of many ways, as would be apparent to one of ordinary skill in the art, such as setting an interrupt handler, checking the timer manually at one or more of the decision points that are routinely executed (such as step 510), or the like.

In one embodiment, the coordinator node 250 determines the boundary period timeout value T based on factors such as the number of slave nodes, the length of time of the intervals, the speed of communication between the nodes, or the like. In another embodiment, T is always fixed at 10 seconds. According to one example, T is much shorter than the interval length, and allows for a reasonable time for all of the slave nodes 220, 230, 240 to transmit their final partial aggregates for the current interval to the coordinator node 250. For example, T might be 10 seconds while an interval may be a 24-hour period, or T might be 3 seconds while an interval is a five-minute period.

Referring again to step 510, if the current interval has not expired, processing proceeds to step 550, where the coordinator node 250 checks to see if it has received an updated partial aggregate from any of its slave nodes 220, 230, 240. If no update has been received, the coordinator node 250 returns to step 510. If an update has been received, the updated partial aggregate is processed in step 560.

Figure 6A:
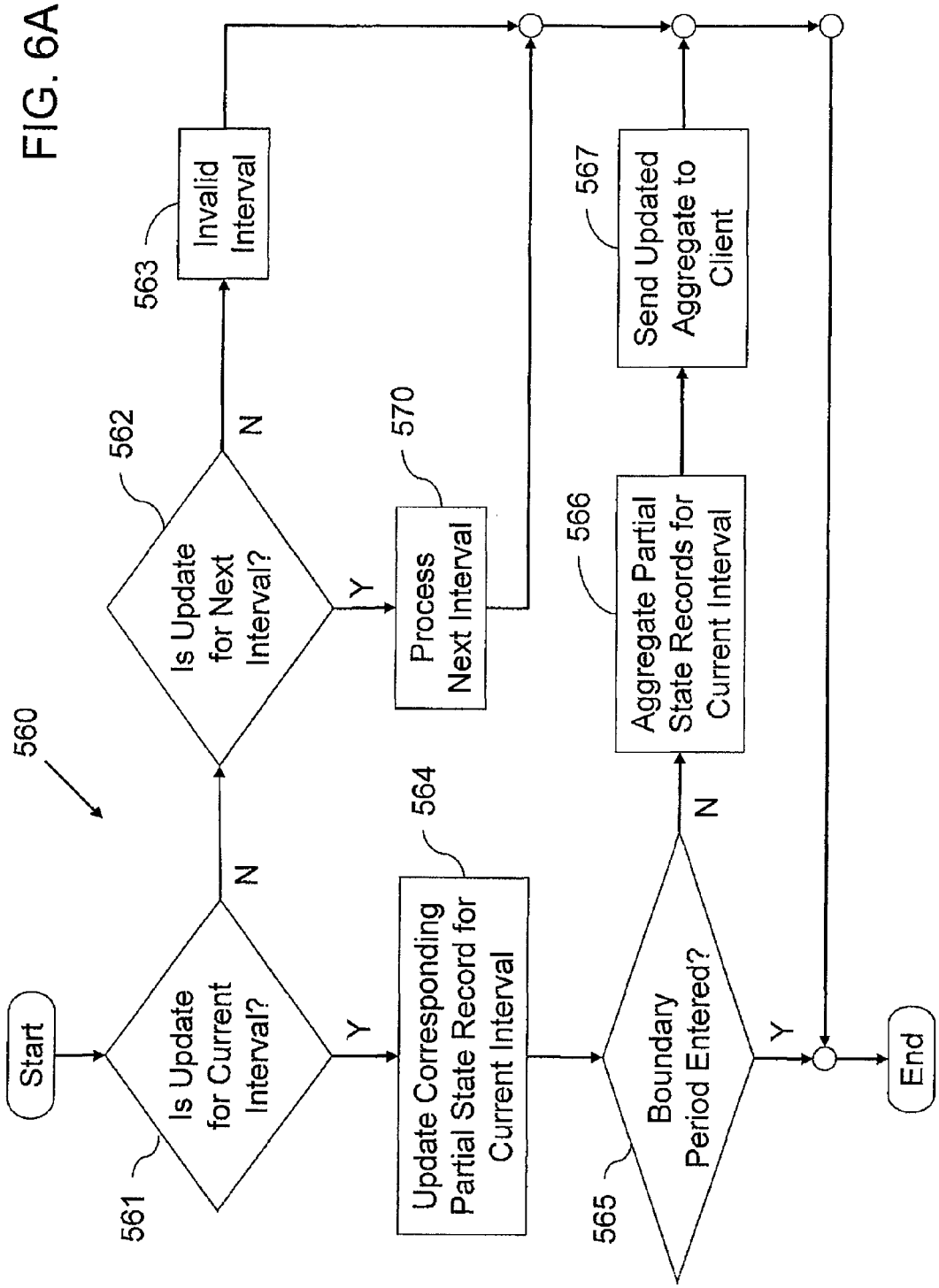

FIGS. 6A and 6B are more detailed flow diagrams of step 560 executed by the coordinator node 250 for processing an updated partial aggregate of the distributed aggregation statistic on the growing interval received from a slave node 220 according to an embodiment of the present invention.

Processing begins and in step 561, the coordinator node 250 examines the received partial aggregate and determines whether the interval identifier included with the aggregate identifies the current interval. If not, in step 562, the coordinator node 250 determines whether the interval identifier identifies a next interval. If not, the coordinator node 250 determines, in step 563, that the identified interval is invalid. In this case, the coordinator node 250 takes some appropriate action, e.g., the update may be discarded, the condition may be reported to an appropriate process or person, and/or other similar actions may be taken. This event (i.e., an updated partial aggregate being associated with an invalid interval) can take place if, for example, the partial aggregate reaches the coordinator node 250 after expiration of the boundary period timeout time T Referring again to step 561, if the updated partial aggregate is for the current interval, then in step 564, the coordinator node 250 updates its partial state record for the current interval for the corresponding slave node 220 in step 564. For example, the coordinator node 250 may replace a previous partial aggregate for the slave node 220 with the newly updated partial aggregate and store the aggregate in a partial state record.

In step 565, the coordinator node 250 checks whether if the boundary period has been entered. If so, the coordinator node 250 operates in a consistency mode and does no further updated partial aggregate processing. Otherwise, the coordinator node 250 operates in availability mode and in step 566, all of the partial state records (e.g., the most recent updated partial aggregate from each slave node 220) are aggregated to produce a running aggregate for the agent-group. This updated running aggregate is then reported to the client 260 in step 567 (in keeping with high availability), after which the coordinator routine ends.

If, in step 562, the coordinator node 250 determines that the interval identifier identifies a next interval, then processing proceeds to step 570, where the coordinator node 250 has received an updated partial aggregate from one of the slave nodes 220, this time for the next interval. Referring now to FIG. 6B, which illustrates a more detailed flow diagram of step 570 executed by the coordinator node 250, in step 572, the coordinator node 250 updates its partial state record for the next interval for the corresponding slave node 220 (e.g., replace the previous partial aggregate for the slave node 220 with the newly updated value).

In one embodiment, the coordinator node 250 maintains a set of flags, one for each slave node 220, indicating if the slave node 220 has completed processing the current interval and started processing the next interval. Accordingly, in step 574, the coordinator node 250 checks to see if just completed update is the first update from this slave node 220 for the next interval (i.e., has the coordinator node 250 set the current interval completed for this slave node 220). If this update is not the first update, then processing ends for the coordinator node 250, noting that the running aggregate for the next interval does not have to be reported to the client 260, as reporting has not completed for the current interval.

If, however, this is the first update of the next interval for this slave node 220, then processing continues to step 576, where the current interval completed flag for the slave node 220 is set. Then, in step 578, the coordinator node 250 sees if the boundary period has been entered and if every slave node 220, 230, 240 has completed sending updates for the current interval (i.e., sees if the boundary period can now be exited). If not, then processing for the coordinator node routine ends. Otherwise, processing continues to step 580, and the boundary period of the current interval is exited (for the coordinator node 250 to complete processing the current interval and start processing the next interval), after which the coordinator node routine ends.

Figure 7:
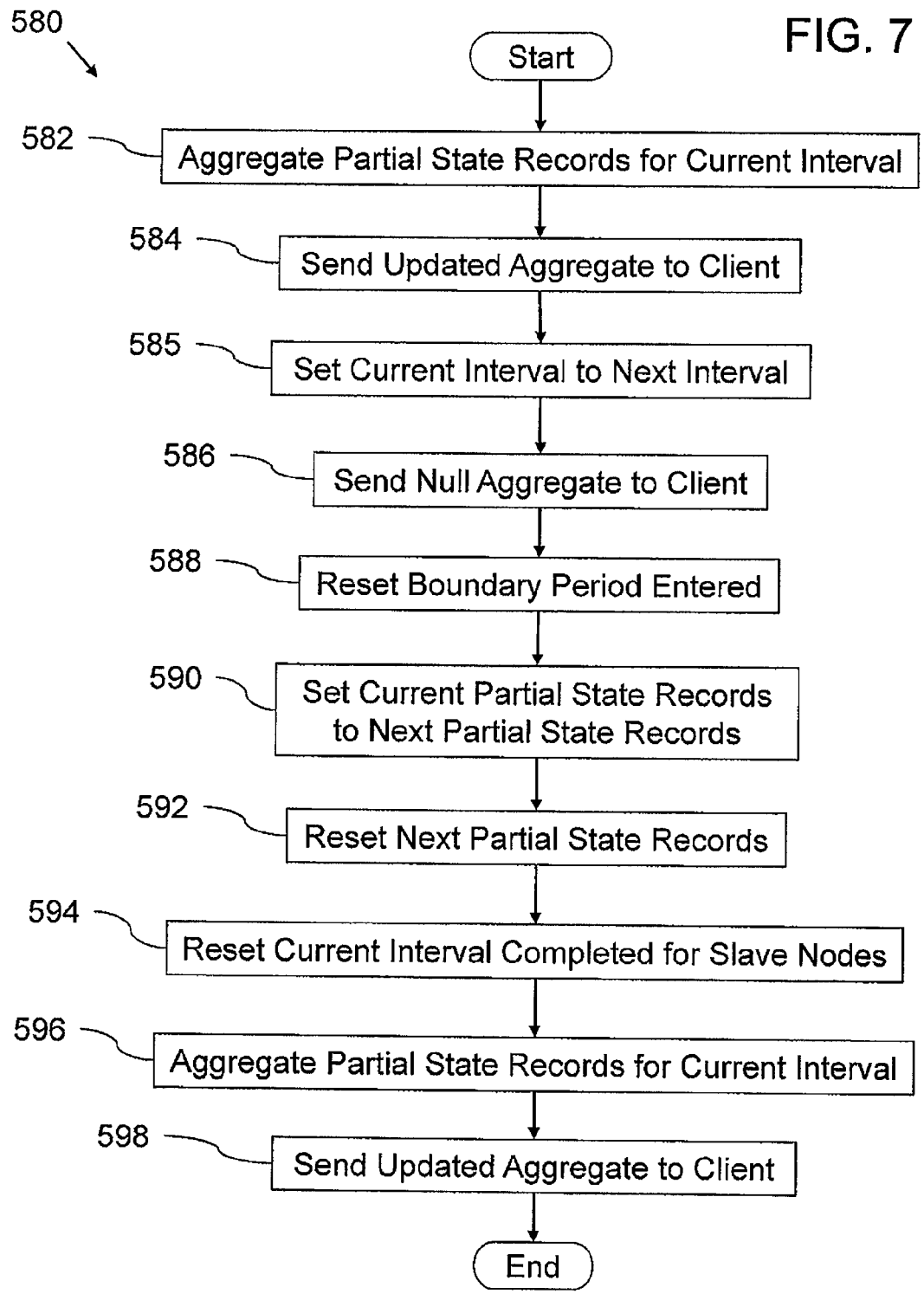
FIG. 7 is a flowchart of a process executed by the coordinator node for exiting a boundary period of the current interval for the distributed aggregation statistic on the growing interval according to an embodiment of the present invention.

FIG. 7 is a flowchart of a process 580 executed by the coordinator node 250 for exiting a boundary period of the current interval for the distributed aggregation statistic on the growing interval according to an embodiment of the present invention.

In the process 580, the coordinator node 250 resets the current interval, making the next interval the new current interval. Processing begins and in step 582, the (final) partial state records for the current interval from each of the slave nodes 220, 230, 240 are aggregated to produce a final running aggregate for the current interval. This final aggregate represents a consistent value over the entire current interval. Accordingly, in step 584, this final updated aggregate for the current interval is reported to the client 260 (to maintain the consistency mode processing between intervals). In step 585, the current interval is set to the next interval (e.g., advances one day, or increments by one). In step 586, a null aggregate is sent to the client. This signifies the end of the current interval, where the previous value that was sent representing the aggregated statistic over the entire current interval). In step 588, the boundary period flag is reset.

In step 590, the partial state records (which are maintained at the coordinator node 250 in one embodiment) for the current interval are initialized to the partial state records for the next interval, for each of the slave nodes 220, 230, 240. The partial state records for the next interval are then reset in step 592. This preserves consistency of data across the different intervals. In step 594, the current interval completed flags (which are maintained at the coordinator node 250 in one embodiment) are reset for each of the slave nodes 220, 230, 240. In step 596, availability mode resumes with the aggregation of the partial aggregates from each of the slave nodes 220, 230, 240 for the (now) current interval. This new updated running aggregate is then sent to the client 260 in step 598, and the boundary period for the coordinator node 250 is exited.

While not separately described, the boundary period exiting routine 580 is similar (for example, could share the most of the same steps) to a routine for initializing the coordinator node 250. In one embodiment, the coordinator node 250 enters the boundary period exiting routine 580 at step 585 to perform the initialization for the coordinator node 250.

Sliding Interval

A process flow of the distributed aggregation statistics over a sliding interval will now be described with reference to FIGS. 8-9. Each of the processes may be described in terms of a software routine executed by one or more processors based on computer program instructions stored in memory (e.g., by a computer device). A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 8:
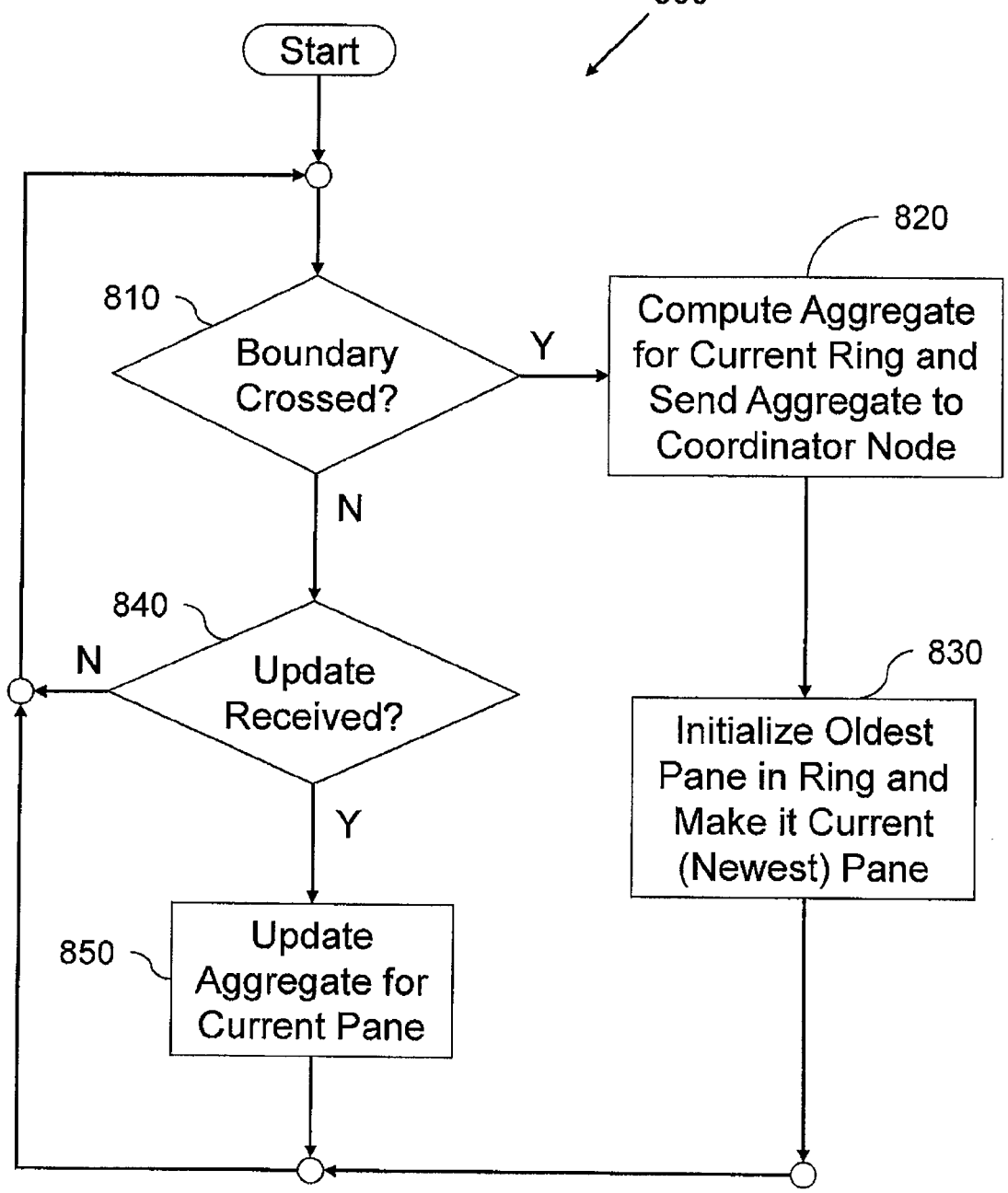
FIG. 8 is a flowchart of a process executed by a slave node for processing the distributed aggregation statistic on the sliding interval according to an embodiment of the present invention.

FIG. 8 is a flowchart of a process 800 executed by the slave node 220, 230, 240 for processing a distributed aggregation statistic on a sliding interval according to an embodiment of the present invention. A person of skill in the art should recognize that the process may also be implemented by the coordinator node 250 performing the role of a slave node in addition to its role of a coordinator node 250. For ease of description, slave node 220 will be described as a representative slave node.

According to one embodiment, the slave node 220 is responsible for maintaining a running, partial aggregate for the statistics that it collects over a ring of G most recent panes. In some embodiments, the slave node 220 may be responsible for maintaining a running partial aggregate over a different period of time, such as a pane or an entire sliding window. The slave node 220 collects and aggregates the corresponding updates of the subset of agents it manages. As described above, doing the aggregation in a multi-level approach, such as with rings and panes, with slave nodes 220, 230, 240 doing the pane-level aggregation into each ring, and the coordinator node 250 doing the ring-level aggregation into the sliding interval, may help distribute the aggregation more evenly among the nodes and help prevent or lessen the likelihood of a serial bottle neck at the coordinator node 250. In this regard, each slave node 220 maintains a queue of length G representing the G most recent panes (one partial aggregate per pane), for example, one ring.

Processing begins, and in step 810, the slave node 220 determines whether a pane boundary has been crossed, signaling the end of the current pane (e.g., no more updates are aggregated into the running partial aggregate for the current pane) and the start of a new pane. For example, the slave node 220 may receive a pane boundary crossed signal at a consistent time (such as at every 10 seconds), and the receipt of the signal may be an indication to the slave node 220 that it should conclude processing for the current pane and switch processing to the next pane. For instance, in one embodiment, the coordinator node 250 may send such a signal, while in another embodiment, a timer (such as a global timer) may trigger the signal.

According to one embodiment, crossing a pane boundary causes any new updates from the agents to be aggregated into a next pane. However, existing updates whose corresponding partial aggregates may still be working their way to the coordinator node 250 are aggregated as part of a current (or previous) pane. According to one embodiment, the slave node 220 crosses the boundary in step 810 only once per pane, regardless of how many times step 810 is performed. For ease of description, the process flow of FIGS. 8-9 will hereinafter be described in terms of a slave node 220 basing the time of an update from an agent with respect to the receipt time of the update by the slave node 220.

If the slave node 220 has determined that the boundary has been crossed, the slave node 220 computes and transmits the current ring's final aggregate to the coordinator node 250 in step 820. According to one example, the final aggregate is the aggregate of the G partial aggregates for the corresponding last G panes that the slave node 220 stores in its queue. This allows the coordinator node 250 to see a final aggregate from the slave node 220 for the current ring.

In step 830, the slave node 220 deletes the oldest (e.g., the Gth oldest) pane in the ring by initializing (e.g., clearing, setting to NULL, etc.) its partial aggregate and making it be the newest pane in the ring. Thus, subsequent updates received from the agents are aggregated into this newest pane, which is now the current pane.

In one embodiment, the nodes identify each pane uniquely (e.g. via a pane identifier), such as with a date or time stamp (representing, for example, the end time E of the ring, so that the ring encompasses the time from E-R to E, where R represents the ring size in units of time), or with a counter incrementing from zero. This allows updates for a statistic to be tied to the correct pane (e.g., to keep the global aggregate for the current ring consistent). Step 830 may also serve as an entry point for an initialization routine for the slave node 220, where the slave node 220 initializes the current pane. For example, the slave node 220 may set the current pane (e.g., pane identifier) to the current date or time, or set it to zero. Processing then repeats, starting with step 810, checking for boundary crossing (of the next pane).

Referring again to step 810, if the slave node 220 determines that the pane boundary has not been crossed, processing proceeds to step 840, where the slave node 220 checks to see if it has received an update from any of its agents. For ease of description, in the slave node routine 800, the updates from the agents are described as being simple tuples (for example, a value or set of values being capable of being aggregated into an aggregated statistic or statistics). If no update has been received, the slave node 220 loops back to step 810 for determining whether the pane boundary has been crossed.

If the slave node 220 has received an update from one of its agents, processing proceeds to step 850, where the slave node 220 updates the running partial aggregate for the current pane with the new value from the agent. The new value may be, for example, a count request (e.g., increment a counter by one, as might happen when the agent completes a call), or a number (e.g., a number of minutes of the just completed call by the agent). Processing then repeats, starting with step 810, checking for pane boundary crossing.

Figure 9:
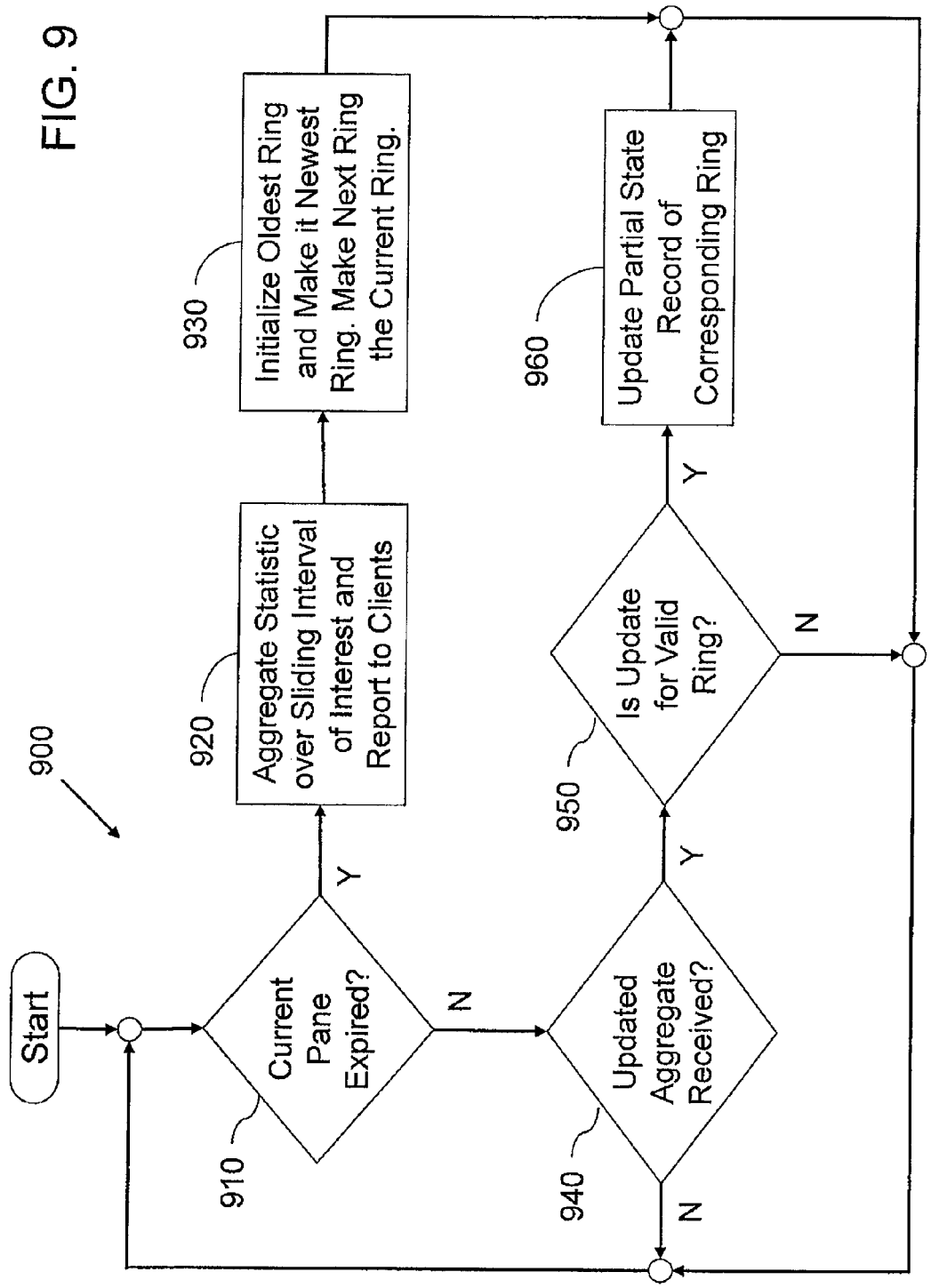
FIG. 9 is a flowchart of a process executed by the coordinator node for processing the distributed aggregation statistic on the sliding interval according to an embodiment of the present invention.

FIG. 9 is a flowchart of a process 900 executed by the coordinator node 250 for processing the distributed aggregation statistic on the sliding interval according to an embodiment of the present invention. According to one embodiment, the coordinator node 250 is responsible for maintaining a running global aggregate for a particular statistic for each of a set of rings that make up a sliding interval for the slave nodes 220, 230, 240 (as well as for the coordinator node 250, if it is also acting as a slave node).

In some embodiments, the partial aggregates maintained at the coordinator node 250 may encompass other groupings, such as by individual slave node, or by pane, or by sliding interval, as would be apparent to one of ordinary skill in the art. For ease of description, the process 900 depicts the coordinator node's 250 role as coordinating all of the partial aggregates for each ring that may contribute to a statistic that may need to be reported to a client 260, and not the possible additional role as another slave node. In addition, an individual slave node will be described in reference to slave node 220, while the group of slave nodes will be described in reference to slave nodes 220, 230, 240. In a similar fashion, an individual client will be described in reference to client 260, while the group of clients will be described in reference to clients 260, 270.

Processing begins, and in step 910, the coordinator node 250 determines whether a current pane boundary has been crossed (i.e., if the current pane has expired). According to one embodiment, the crossing of a boundary signals that a final aggregate for a sliding interval (for example, the current sliding interval) should be determined and forwarded to the clients 260, 270. In one embodiment, the coordinator node 250 maintains partial state records (e.g., partial aggregates of the statistic) for the rings that make up the sliding intervals that may still need to be reported. That is, the coordinator node 250 maintains a queue (e.g., circular array) of ring PSR's, ordered from oldest to newest.

For example, the coordinator node 250 may maintain ring PSRs going back to the oldest ring making up a sliding interval that may be reported to a client 260, and going forward to the next ring (after the current ring), in case one of the slave nodes 220 sends an update for the next ring before the coordinator node 250 has a chance to finish the current ring. Each slave node 220 may send a final updated partial aggregate for its subset of agents when it crosses the pane boundary. Accordingly, the coordinator node 250 may process partial aggregates from the slave nodes 220, 230, 240 that collectively span many rings or panes.

It should also be noted that the rings may overlap. That is, if there are G panes in the current ring, the coordinator node 250 may maintain G separate PSRs for this ring, one PSR for each partial aggregate of the last G panes ending at each of the panes in the current ring. While only one of these PSRs would be used to compute a total aggregate for a current sliding window W, the other PSRs may be used to compute a total aggregate for a sliding window that has moved to a new pane.

Thus, if there are a total of R rings in the sliding window W, the coordinator node may maintain R separate ring PSRs, that is, one PSR for the last G panes (making up the last ring), one PSR for the G panes immediately preceding the last G panes (making up the previous ring), etc., for each of the R rings. These R PSRs (or, more precisely, the R−1 most recent of these PSRs) may be used again after G more panes are processed to process the total aggregate for the current sliding window W. However, before then, different sets of R PSRs (one set for each of the G possible pane offsets in a ring) may be used to compute the total aggregate for the current sliding window W. In this fashion, the coordinator node 250 only has to aggregate the R PSRs that make up the current set of rings for a sliding window W, and not the R×G PSRs (one PSR for each pane) that would be needed if PSRs were only maintained on an individual pane basis at the coordinator node 250.

In step 910, if the current pane has just expired, processing proceeds to step 920, where the statistic over the sliding interval of interest (considering the number of delay panes D) is aggregated from its constituent ring PSRs (for example, aggregating M separate ring PSRs spaced R apart and ending at the current pane minus the number of delay panes D). This global aggregate for the sliding interval of interest is then reported to the clients 260, 270. In step 930, the oldest ring PSR in the queue is initialized (e.g., cleared, set to NULL, etc.) and made to be the newest ring PSR. In addition, the next ring is made the current ring. Processing then repeats, starting with step 910 (checking for pane boundary crossing, only this time for the next pane).

Referring again to step 910, if the current pane has not expired, processing proceeds to step 940, where the coordinator node 250 checks to see if it has received a partial aggregate for a ring from one or more of its slave nodes 220, 230, 240. If no update has been received, the coordinator node 250 returns to step 910. If an update has been received, the coordinator node 250 checks in step 950 to see if the ring aggregate corresponding to the update is currently being maintained in the queue of ring PSRs. This check helps prevent errant or stray ring updates from corrupting the aggregates for the active rings being processed. According to one embodiment, the coordinator node 250 ignores such aberrant updates (and returns to step 910). In one embodiment, the coordinator node 250 may take a different action, such as alerting an operator of the stray communication or the like. If the update is for a valid ring, processing proceeds to step 960, where the PSR for the corresponding ring is updated by aggregating the existing PSR with the update. Processing then returns to step 910.

Low Latency Sliding Interval

In another embodiment of the present invention, aggregate partial records for the sliding interval statistic are collected asynchronously and become reflected in a total aggregate immediately, thus providing much lower latency. By choosing an appropriately small pane size P, the updating period may be made to accommodate the type I (availability) statistics, while type II (consistency) statistics may be better handled with a larger pane size P. While one or more levels of rings (as described above) may also be used in some embodiments, for ease of description, only panes will be described in the low latency sliding interval embodiments below. As with the above embodiments, multiple nodes (for example, slave nodes 220, 230, 240 and coordinator node 250 depicted in FIG. 2) monitor agent activity and perform the aggregation. For simplicity, a general slave node may be referred to as slave node 220.

Further, events that span multiple panes have statistics accumulated over their entire lifetime. That is, rather than waiting for an event (such as a call or other transaction) to complete or otherwise reach some reporting event moment, the event is continuously tracked over the numerous panes in which it is actively accumulating statistical information. Such an event will be referred to as current or ongoing, and its partial state records maintain separate fields for the ongoing or current aggregations, as opposed to completed events, which will be referred to as completed or historical, and whose data is tracked in separate fields in the partial state records. Another way to think of current or ongoing events is that their statistical information may be subject to change with each new pane, while the statistical information for completed or historical events may be regarded as fixed and not subject to change with each new pane (other than for obvious circumstances such as the event no longer fitting in the current sliding interval being processed).

Figure 10:
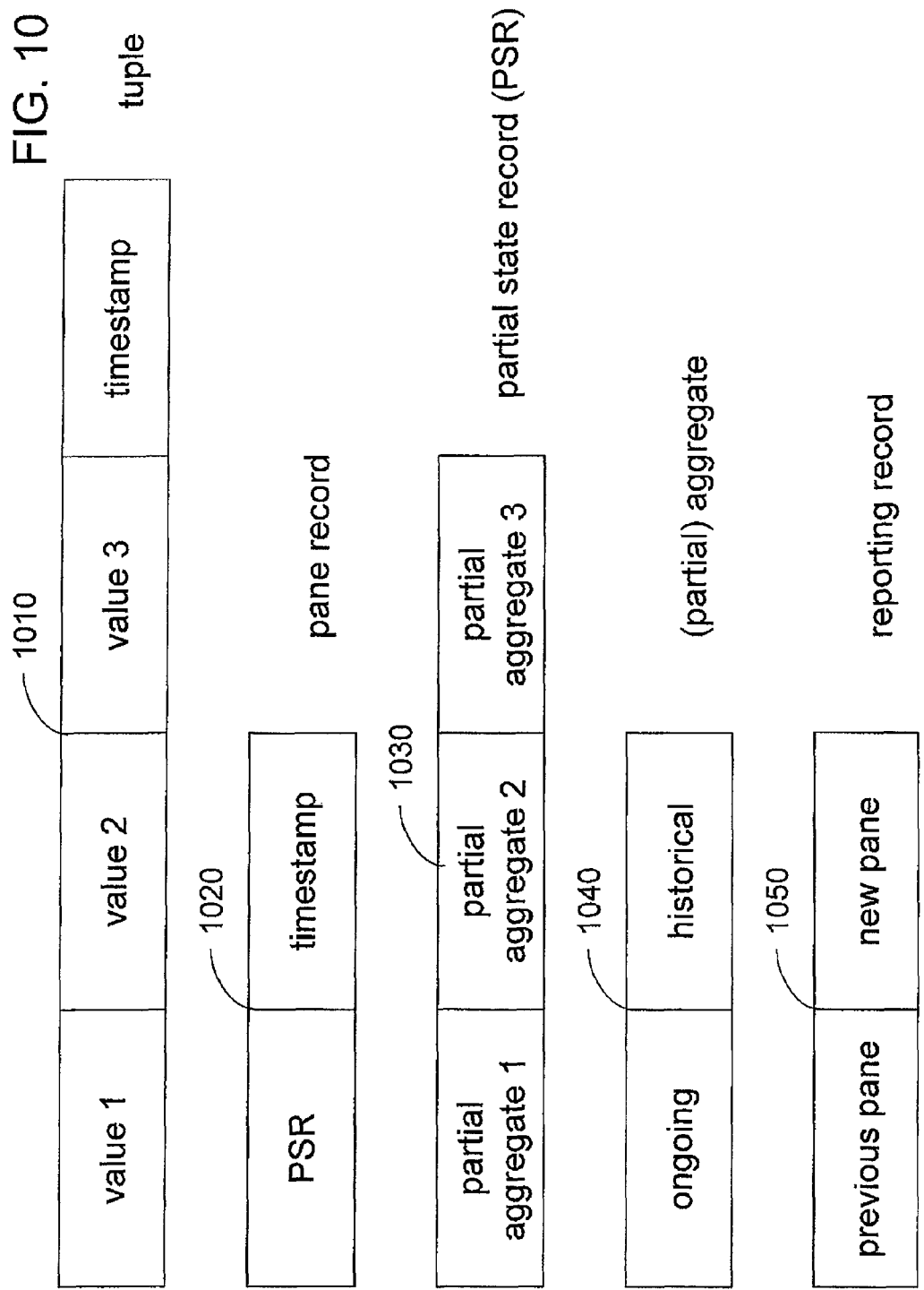
FIG. 10 is an illustration of different data structures used to track statistics over a sliding interval with low latency according to an embodiment of the present invention.

FIG. 10 is an illustration of different data structures used to track statistics over a sliding interval with low latency according to an embodiment of the present invention.

Each node (for example, each slave node 220 as well as the coordinator node 250) may monitor only a sub-set of agents, belonging to a particular agent-group. Each agent may generate a statistic for aggregation in the form of a data tuple (value (or set of values), timestamp), such as tuple 1010, where the values are aggregated over a sliding window of time encompassing the corresponding timestamps. The values may be aggregate values (such as values that can be aggregated with other such values) or indicators (such as to denote a completed event versus an ongoing event). Each agent may forward its data tuples to its corresponding node responsible for the agent's agent-group. While each node may store the data tuples of interest (e.g., of a type of data being tracked, within a period of time for which sliding interval statistics are desired, etc.) explicitly, which allows total or partial aggregates to be computed by aggregating all of the corresponding tuples, this may be prohibitive memory-wise (to store all the tuples) or computation-wise (to continuously aggregate all of the tuples).

Instead, and according to embodiments of the present invention, each node may maintain partial aggregates of the data for the current pane (of fixed length P, where a sliding window of length W is broken up into N contiguous panes), in which the most recent tuples are incorporated. For example, within each node, each pane record, such as pane record 1020, may be defined as a pair {partial state record, timestamp}, where the partial state record (PSR) represents the aggregation of the statistic among the agents of the corresponding agent-group for the node over the pane being processed, and the timestamp is an identifier of the particular pane (such as when the pane starts, each pane being of length P). For example, the PSR may be composed of three separate aggregates, as in PSR 1030, each aggregate (or partial aggregate) being used to accumulate or otherwise aggregate a particular statistic over the agent-group. In one embodiment, for instance, separate aggregates may be used to maintain statistics for the number of calls, the total length of the calls, and the maximum length of any one call.

According to one or more embodiments, some of the events being tracked are ongoing (such as active calls), while others are historical (such as completed calls). Accordingly, the aggregates or partial aggregates can be embodied in two fields, one for the ongoing component, and one for the historical component, such as aggregate 1040. This allows aggregation of the statistics to reflect the latest data (e.g., ongoing events) by doing an aggregation of the ongoing and historical components prior to reporting the statistics to a client (such as a reporting program). In the example above, this allows the number of calls, the total length of the calls and the maximum length of any one call to reflect the ongoing calls (whose data may otherwise not be reflected until the completion of the calls), thus providing low latency in the reporting of such statistics.

In one embodiment, P represents a number of seconds, and every P seconds (starting at, for example, midnight), a new pane is created. To maintain consistency of the ongoing events and the corresponding aggregations, the pair {previous pane, new pane}, such as reporting record 1050, is sent to the coordinator node 250 from each slave node 220 (and possibly the coordinator node 250, when also acting in a slave node capacity for its own agent -group). Here, the previous pane record refers to the data for the pane last sent to the coordinator node 250, while the new pane record refers to the data for the pane presently being processed. It may be that both the previous pane record and the new pane record represent the same pane (the new pane record having more recent data), or the previous pane record may be for an earlier pane (like the immediately preceding pane) than the new pane record. By sending both pane records, the coordinator node 250 can adjust for events that are ongoing (and thus may already have partial statistical information reflected in the present aggregates).

The coordinator node 250 may also maintain partial aggregates (partial state records) for its own agent-group, which it aggregates with the corresponding partial state records from each of the slave nodes 220. The coordinator node 250 may be a dedicated node, to distinguish it from the slave nodes 220, with all final aggregation for the statistic taking place at the coordinator node 250. The coordinator node 250 may be selected by any of a variety of techniques as would be known to one of ordinary skill in the art. For example, the coordinator node 250 may be selected by static assignment, or dynamic assignment through a complex election procedure, etc. The coordinator node 250 may maintain its own current pane (corresponding to its agent-group) as well as a global current pane (GCP) representing an aggregate of all of the nodes' current panes. For example, for the current pane, the GCP may contain a PSR for the current pane for each of the nodes. An aggregate over all of the nodes for the current pane may then be computed by aggregating all of the PSRs in the GCP.

Figure 11:
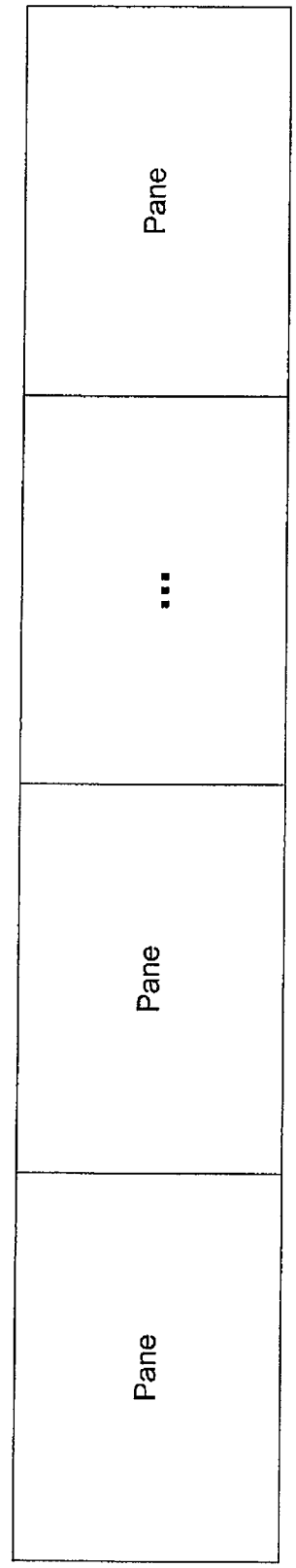
FIG. 11 is a block diagram of a logical arrangement of panes involved in aggregating and reporting a distributed aggregation statistic for a contact center over a sliding interval with low latency, according to an embodiment of the present invention.

FIG. 11 is a block diagram of a logical arrangement of panes involved in aggregating and reporting a distributed aggregation statistic for a contact center over a sliding interval with low latency, according to an embodiment of the present invention. The coordinator node 250 may maintain a circular array R of panes (as depicted in FIG. 11), for example, each pane representing a global aggregate of all of the nodes' partial state records for the corresponding period of time represented by the pane, where the circular array R has N such panes representing the sliding window of length W. The coordinator node 250 may then compute a final aggregate for a statistic by aggregating the statistic over the GCP plus all of the earlier panes (as tracked in the array R of panes) that make up the current sliding window W. That is, the current and historical components may be aggregated into one final statistic over the GCP and all the panes in the array R.

When the reporting record 1050 or pair {previous pane, new pane} is received from a node (such as a slave node 220, or the coordinator node 250 acting in a slave node capacity for its own agent-group), the coordinator node 250 may update the GCP in the array R by "subtracting" (or otherwise eliminating the presence of) the data from the previous pane and "adding" (or otherwise incorporating the presence of) the data from the new pane. This incremental computation may be possible, for example, with appropriate assumptions on the data and the aggregation. The updated content of GCP, and in turn the array R, may then be used to produce the current global aggregate over the current pane and the sliding window.

For ease of description, an embodiment will be described with the following assumptions. However, many of these assumptions are for convenience of description, and the present invention is not limited thereto. For events being tracked on an ongoing basis (e.g., spanning multiple panes, with partial updated statistics being aggregated each pane), the aggregation statistic will be assumed to be distributive or algebraic, with "addition" and "subtraction" (the inverse of "addition") defined within the partial state records. Other statistics not as amenable to inverse operations may still be tracked on a completed basis as described above or in conjunction with the ongoing statistics (using, for example, only the historical components).

The ongoing component of the aggregate PSR may be stored separately from its historical component (for example, in the GCP and each of the previous panes in the array R), where the aggregation is done on a sliding window of fixed length W. Each sliding window may represent N=W/P panes, where each pane holds an aggregate over an interval of length P. Aggregating both the ongoing and historical components for both the GCP as well as each of the previous panes in the array R) will thus produce a combined aggregate over the entire sliding window W.

Additional simplification assumptions (that may included) are that the nodes may run on different machines, the time of different nodes or machines may be slightly out of sync, and the nodes may communicate asynchronously. For example, in one embodiment, it may be assumed that the protocol of communication is reliable, so that events or other communications from one node to another are never lost and always come in order; subject to delays (possibly arbitrary delays). It may also be assumed for simplicity that node disconnects may be detected using, for example, some failure detector (such as periodic heartbeat between nodes), with appropriate recovery techniques already in place for such contingencies. Other assumptions (as described above in other embodiments) may also be made.

Additional details of an embodiment of a distributed aggregation statistic for a contact center over a sliding interval are provided in FIGS. 12-18.

FIG. 12 illustrates some aggregation operations for processing a distributed aggregation statistic for a contact center over a sliding interval with low latency, according to one embodiment of the present invention.

Example aggregation operations include: Ongoing(A), which returns the ongoing component of an aggregate A (e.g., statistics for events that are still ongoing and uncompleted); Historical(A), which returns the historical component of aggregate A (e.g., statistics for events that have already completed); Refresh(A), which processes ongoing events for an aggregate A (such as updating their statistics to reflect more current values, or handling the completion of such events, including moving ongoing statistics to historical statistics); Reset(A), which resets the historical component of aggregate A; A+B, which "adds" or otherwise aggregates two aggregates A and B (on a field by field and component by component basis); A−B, which "subtracts" or otherwise performs the inverse of aggregate B from aggregate A (also on a component by component and field by field basis); and A\B, which "subtracts" or otherwise performs the inverse of the ongoing component of aggregate B from aggregate A (while leaving the historical components alone).

FIG. 13 illustrates some pane operations for processing a distributed aggregation statistic for a contact center over a sliding interval with low latency, according to one embodiment of the present invention. Here a pane record P includes an aggregate A and a corresponding timestamp T (such as the start time for the pane). The coordinator node 250 maintains a global current pane (GCP) of an aggregate over all of the agent-groups for the current pane. As above, the aggregate includes ongoing and historical components that are maintained separately, but aggregated to produce any final aggregates for reporting purposes. In addition, the coordinator node 250 maintains a circular array R of the N−1 most recent panes $P_1, P_2, \ldots, P_{N-1}$ (before the GCP) that make up the current sliding window W. An example pane operation is R<<GCP, which inserts the global current pane into the array R of N−1 most recent panes, dropping the oldest pane $P_1$ in the process. Another pane operation is Aggregate(R,GCP), which returns the aggregate of the ongoing and historical components of the GCP and the N−1 most recent panes tracked in array R.

Figure 14:
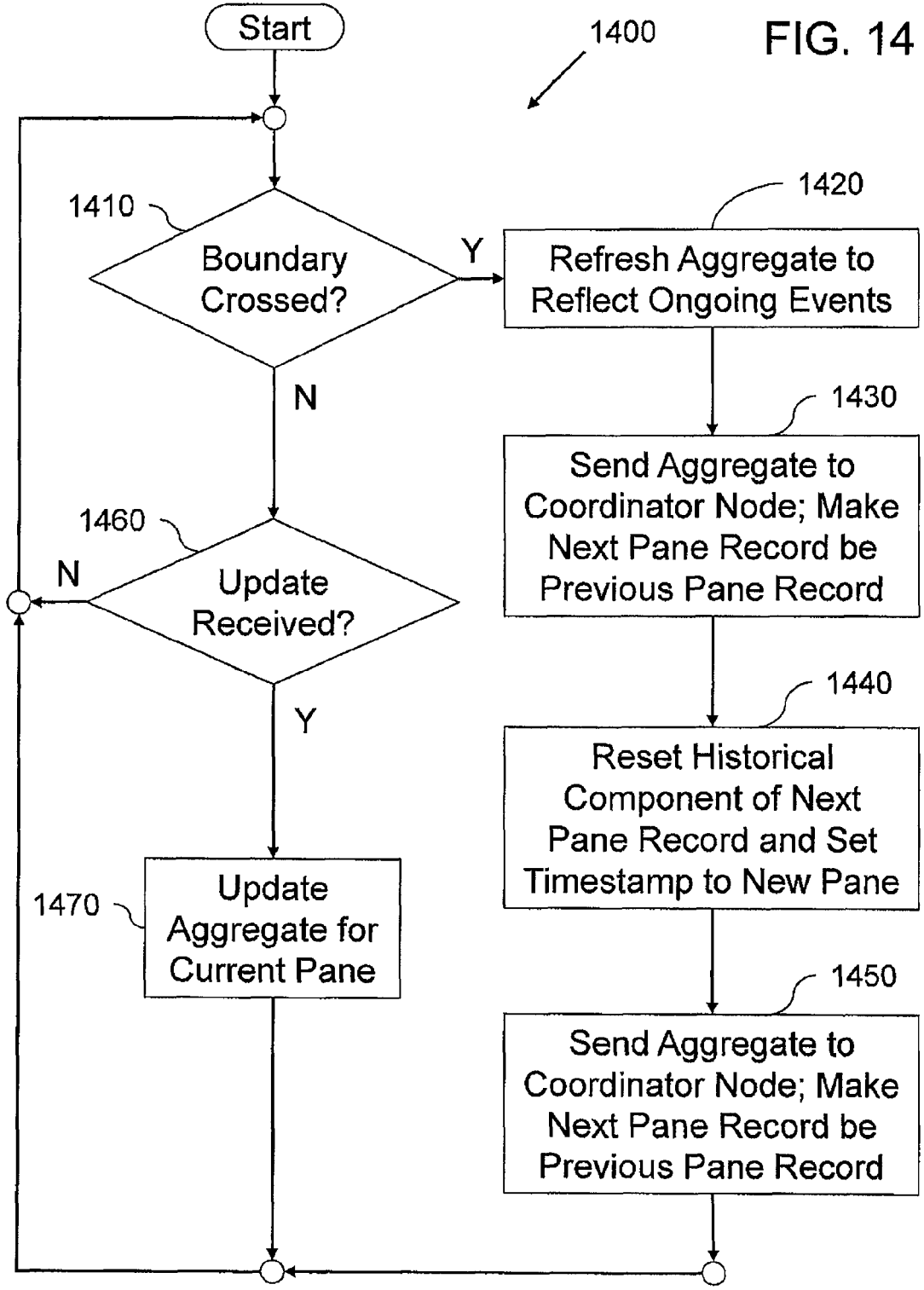
FIG. 14 is a flowchart of a process executed by a slave node for processing a distributed aggregation statistic for a sliding interval with low latency according to an embodiment of the present invention.

FIG. 14 is a flowchart of a process 1400 executed by a slave node 220 for processing a distributed aggregation statistic for a sliding interval with low latency according to an embodiment of the present invention. A person of skill in the art should recognize that the process 1400 may also be implemented by the coordinator node 250 performing the role of a slave node in addition to its role of a coordinator node 250. Accordingly, for simplification, the routine 1400 will be described in terms of a slave node 220. Here, the slave node 220 maintains two pane records 1020, namely a previous pane record and a next pane record. The two pane records 1020 may represent aggregates over the same pane (such as the current pane) or different panes (such as the current pane and the next pane to be processed), depending on the stage of processing. The previous pane record may represent the last pane record sent to the coordinator node 250, while the next pane record may reflect changes to the aggregate (including the pane reflected by the pane record) since the previous pane record.

According to one embodiment, the slave node 220 is responsible for maintaining a running partial aggregate (for both ongoing and historical events) for the statistics that it collects over the most recent pane P. In some embodiments, the slave node 220 may be responsible for maintaining a running partial aggregate over a different period of time, such as a group of panes or an entire sliding window. The slave node 220 collects and aggregates the corresponding updates of the subset of agents it manages. The slave node 220 maintains separate partial aggregates for ongoing (uncompleted) events and historical (completed) events. The main distinction between the two types of events are that the partial aggregates for an ongoing event is subject to change with each new pane (until the event completes) while the partial aggregates for an historical event stay fixed (other than for special circumstances, such as aging out of the current sliding window).

Processing begins, and in step 1410, the slave node 220 determines whether a pane boundary has been crossed, signaling the end of the current pane P (e.g., no more updates are aggregated into the running partial aggregate for the current pane P) and the start of a new pane. For example, the slave node 220 may receive a pane boundary crossed signal at a consistent time (such as at every 2 seconds), and the receipt of the signal may be an indication to the slave node 220 that it should conclude processing for the current pane P and switch processing to the next pane. For instance, in one embodiment, the coordinator node 250 may send such a signal, while in another embodiment, a timer (such as a global timer) may trigger the signal.

According to one embodiment, crossing a pane boundary causes any new updates from the agents to be aggregated into a next pane. However, existing updates whose corresponding partial aggregates may still be working their way to the coordinator node 250 are aggregated as part of a current (or previous) pane. According to another embodiment, the slave node may continue to process previous panes and accept updates for previous panes from the agents. According to one embodiment, the slave node 220 crosses the boundary in step 1410 only once per pane, regardless of how many times step 1410 is performed. For ease of description, the process flow of FIG. 14 will hereinafter be described in terms of a slave node 220 basing the time of an update from an agent with respect to the receipt time of the update by the slave node 220. Accordingly, agents can send updates more frequently or closer in time to the events they signify to cause their corresponding statistics to more timely reflect the events at the global reporting level.

If the slave node 220 has determined that the boundary has been crossed, the slave node 220 refreshes the current pane's partial aggregate in step 1420. For example, for any event that has been completed by the agent, its corresponding statistics may be transferred from the ongoing component to the historical component of the aggregate. In a similar fashion, events that are still ongoing may have their ongoing components updated to reflect newer values. For example, in one embodiment, an agent tracking an ongoing event may send one update to the slave node 220 to signify the event's beginning and another update to the slave node 220 to signify the event's completion. Accordingly, the slave node 220 may perform the updating of the ongoing component of certain statistics during step 1420 to reflect such changes (e.g., elapsed time) for the aggregate on behalf of the agent. In other embodiments, the slave node 220 may wait for the agent to send such updates.

In step 1430, the slave node 220 computes and transmits the current pane's final aggregate to the coordinator node 250. While the aggregate may still contain ongoing and historical components, the processing of recently completed events has been handled in step 1420. Ongoing events may continue for many more panes, and their corresponding statistics continue to aggregate in the ongoing component of the aggregate. To simplify implementation and updating for the coordinator node 250, in one embodiment, the slave node sends a reporting record 1050 that includes the previous pane record sent to the coordinator node as well as the next pane record (or new pane record). This allows the coordinator node 250 to quickly determine the updates to the corresponding components (ongoing and historical) between panes.

Here, the previous pane record and the next pane record may represent the same pane (e.g., having the same start time). For example, in step 1430, the previous pane record may represent the current pane at the beginning of the current pane while the next pane record may represent the current pane at the end of the current pane. In step 1440, the next pane record is made the previous pane record. This allows the coordinator node 250, for example, to see what changes to the aggregate took place between reportings from the slave node 220.

In step 1440, the historical component of the next pane record is reset (its statistics having already been reported to the coordinator node 250, while the timestamp of the next pane record is set to start of the next (new) pane. In addition, the ongoing component of the next pane record is left unchanged, reflecting the current aggregate for the ongoing events. The next pane record is thus initialized to accept updates from the agents for the next pane. In step 1450, step 1430 is repeated, sending the previous and next pane records to the coordinator node. Here, the two pane records represent different panes, thus alerting the coordinator node 250 that the slave node 220 has moved onto a new pane. In addition, the next pane record is made the previous pane record. As the aggregate is left unchanged between the two pane records, this allows the updates made in the new pane to be completely reflected in the next pane record while the previous pane record reflects the aggregate at the start of the new pane.

Referring again to step 1410, if the slave node 220 determines that the pane boundary has not been crossed, processing proceeds to step 1460, where the slave node 220 checks to see if it has received an update from any of its agents. For ease of description, in the slave node routine 1400, the updates from the agents are described as being simple tuples (for example, a value or set of values being capable of being aggregated into an aggregated statistic or statistics). In one embodiment, the slave node may also indicate the completion of an existing ongoing event (together with any last updates for the statistics of the event) or the start of a new ongoing event (together with any initial updates for the statistics of the event). If no update has been received, the slave node 220 loops back to step 1410 for determining whether the pane boundary has been crossed.

If the slave node 220 has received an update from one of its agents, processing proceeds to step 1470, where the slave node 220 updates the running partial aggregate for the current pane with the new value(s) from the agent. The new value(s) may be, for example, a count request (e.g., increment a counter by one, as might happen when the agent completes a call), a number (e.g., a number of minutes of the just completed call by the agent), or a status of an ongoing event (e.g., increment a count by one). Processing then repeats, starting with step 1410, checking for pane boundary crossing. As such, unless the slave node 220 is processing the boundary between panes (or processing updates from other agents, which is an issue of load balancing), as soon as an agent sends an update to the slave node 220, the slave node 220 begins processing the update, and then reflects the update to the coordinating node 250 at the next pane boundary crossing.

Figure 15:
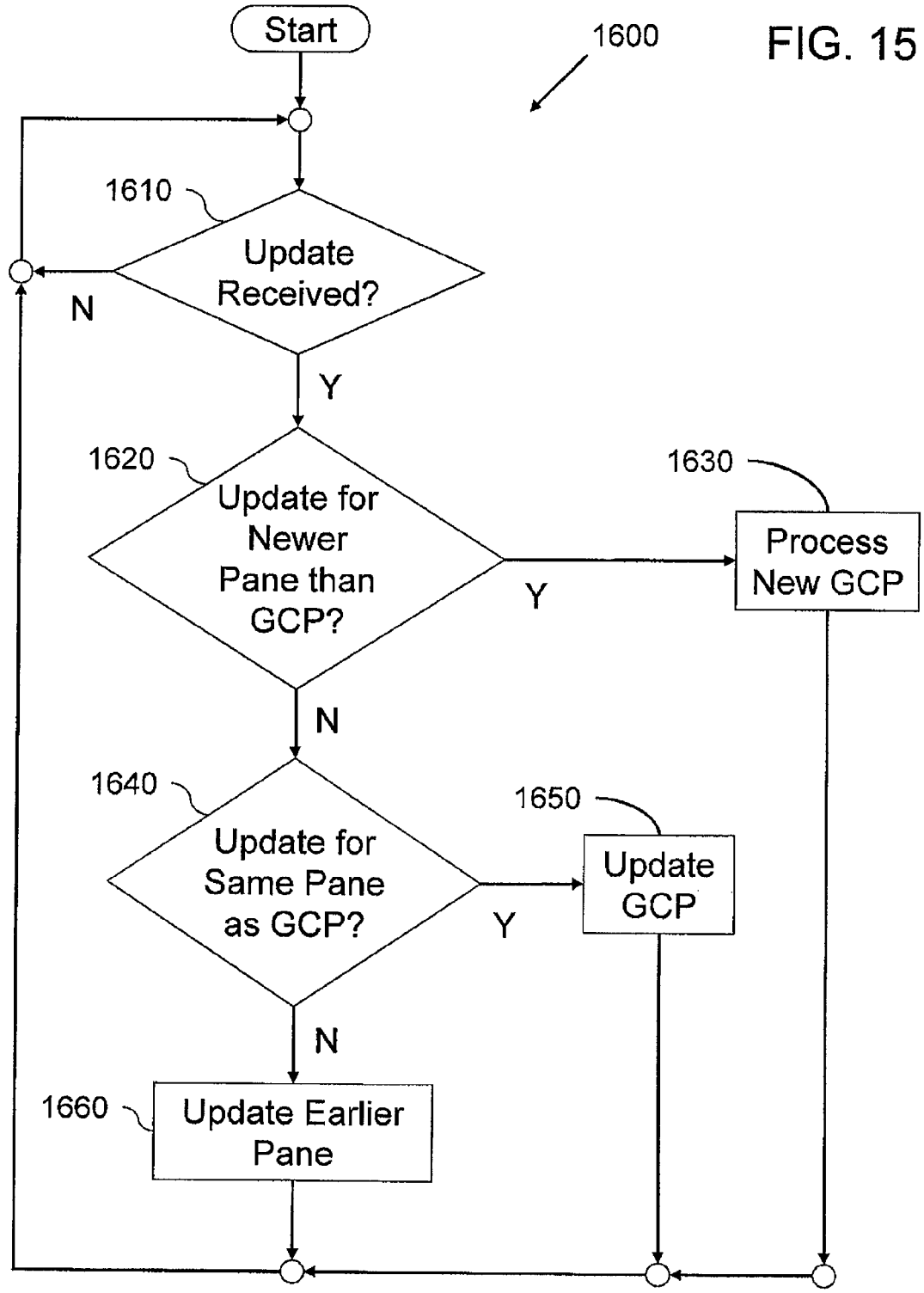
FIG. 15 is a flowchart of a process executed by a coordinator node for processing a distributed aggregation statistic for a sliding interval with low latency according to an embodiment of the present invention.

FIG. 15 is a flowchart of a process 1600 executed by a coordinator node for processing a distributed aggregation statistic for a sliding interval with low latency according to an embodiment of the present invention. According to one embodiment, the coordinator node 250 is responsible for maintaining a running global aggregate for a particular statistic for a global current pane as well as each of a set of previous panes making up a sliding interval for the slave nodes 220, 230, 240 (as well as for the coordinator node 250, if it is also acting as a slave node).

In some embodiments, the partial aggregates maintained at the coordinator node 250 may encompass other groupings, such as by individual slave node, or by groups of panes, or by sliding interval, as would be apparent to one of ordinary skill in the art. For ease of description, the process 1600 depicts the coordinator node's 250 role as coordinating all of the partial aggregates for each pane that may contribute to a statistic that may need to be reported to a client 260, and not the possible additional role as another slave node. In addition, an individual slave node will be described in reference to slave node 220. In a similar fashion, an individual client will be described in reference to client 260.

Processing begins, and in step 1610, the coordinator node 250 checks to see if a new reporting record (update) has been received from a slave node 220. If not, then processing loops back to the beginning to keep checking for a new update. If a new reporting record (including a previous pane record and a next pane record) has been received from a slave node 220, processing proceeds to step 1620, where the timestamp of the pane for the next pane record is compared to that of the global current pane (GCP). If the next pane record is for a newer pane than the GCP, then processing proceeds to step 1630 (see FIG. 16) to process a new global current pane. Otherwise, processing proceeds to step 1640, where the next pane record is checked to see if it is for the same pane as the GCP. If so, processing proceeds to step 1650 (see FIG. 17) to process an update to the GCP. Otherwise, the next pane record is for an earlier pane, so processing proceeds to step 1660 (see FIG. 18) to process an update to an earlier pane.

Figure 16:
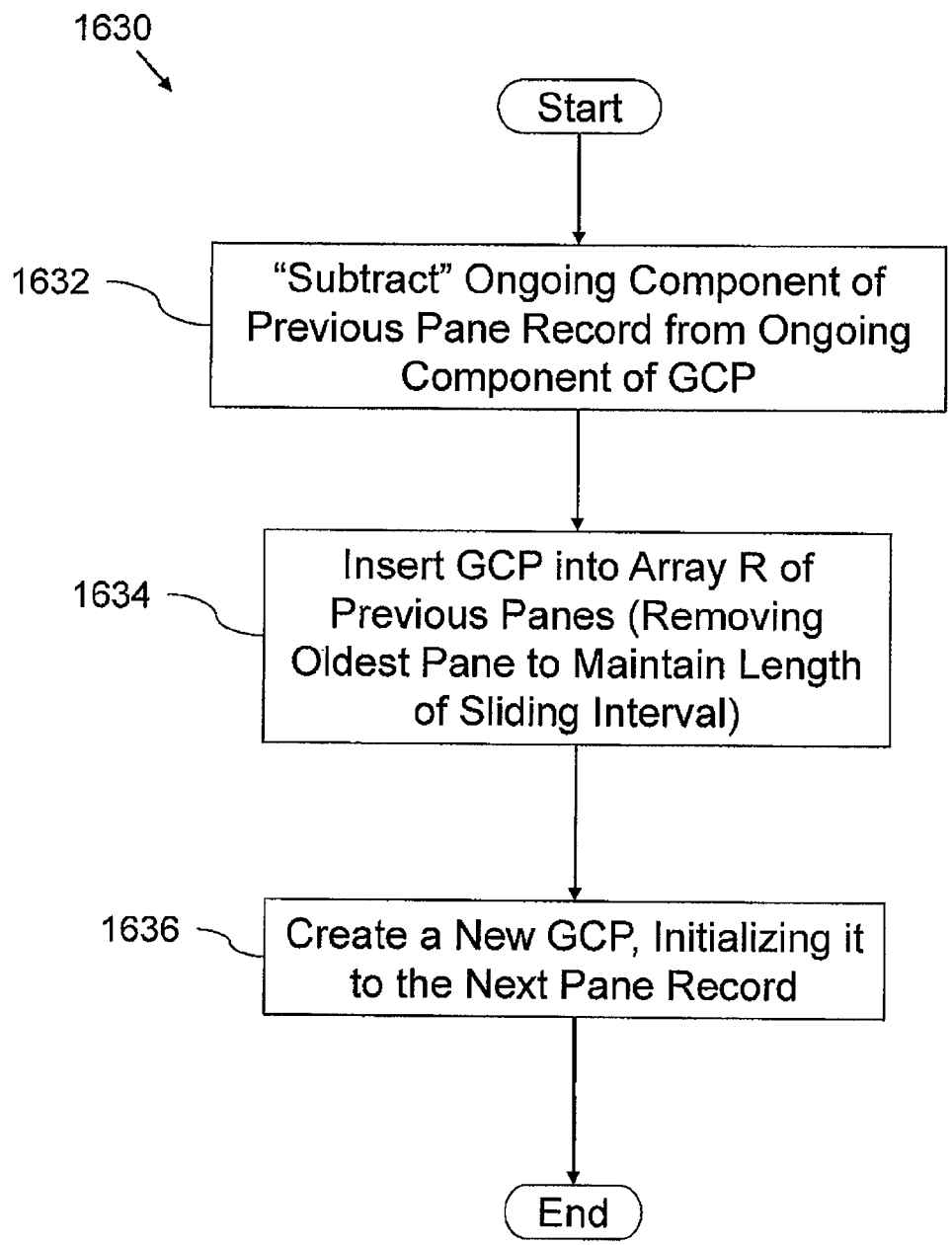
FIGS. 16-18 are flowcharts of processes executed by a coordinator node for processing a distributed aggregation statistic for a contact center over a sliding interval with low latency, according to one embodiment of the present invention.
Figure 17:
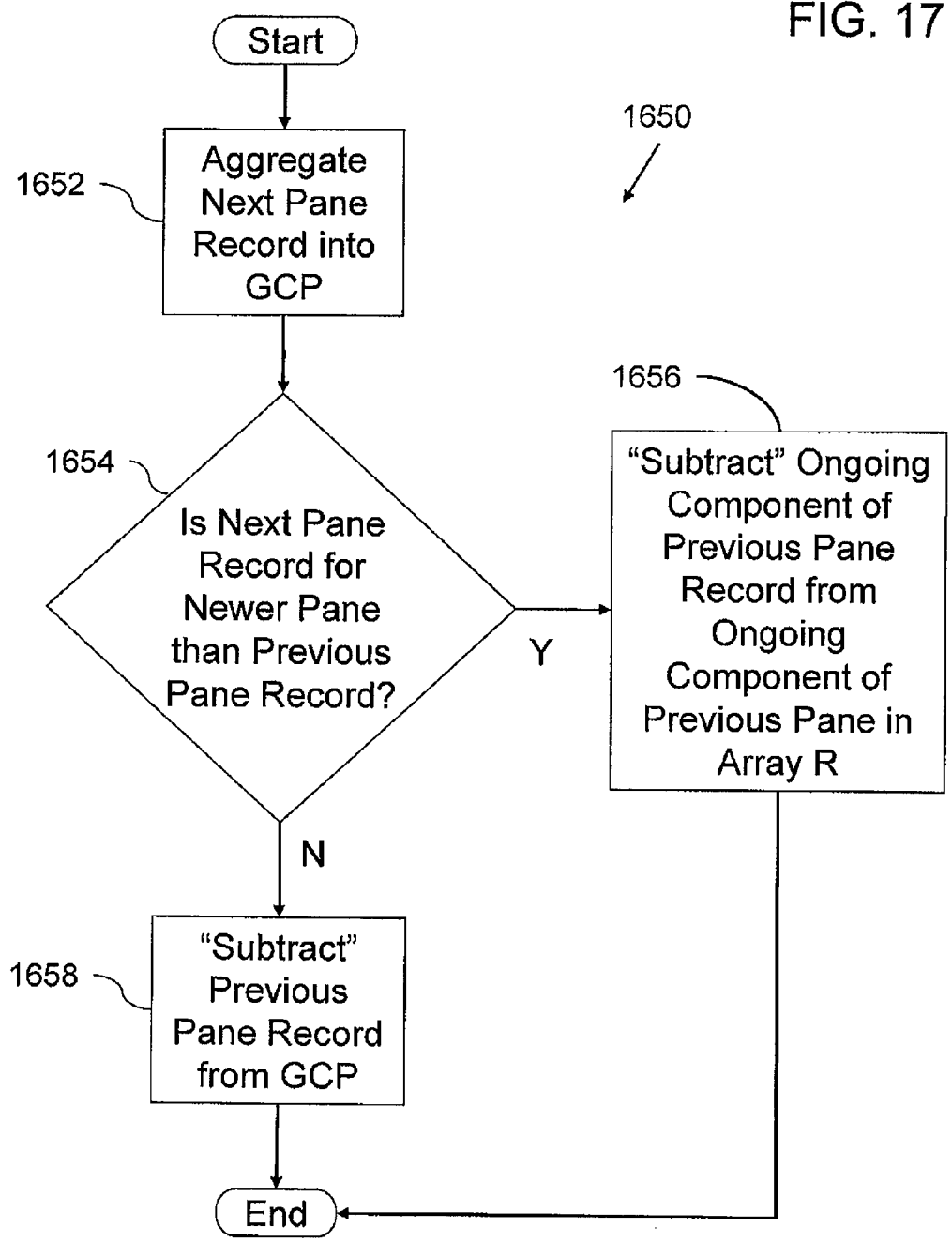
Figure 18:
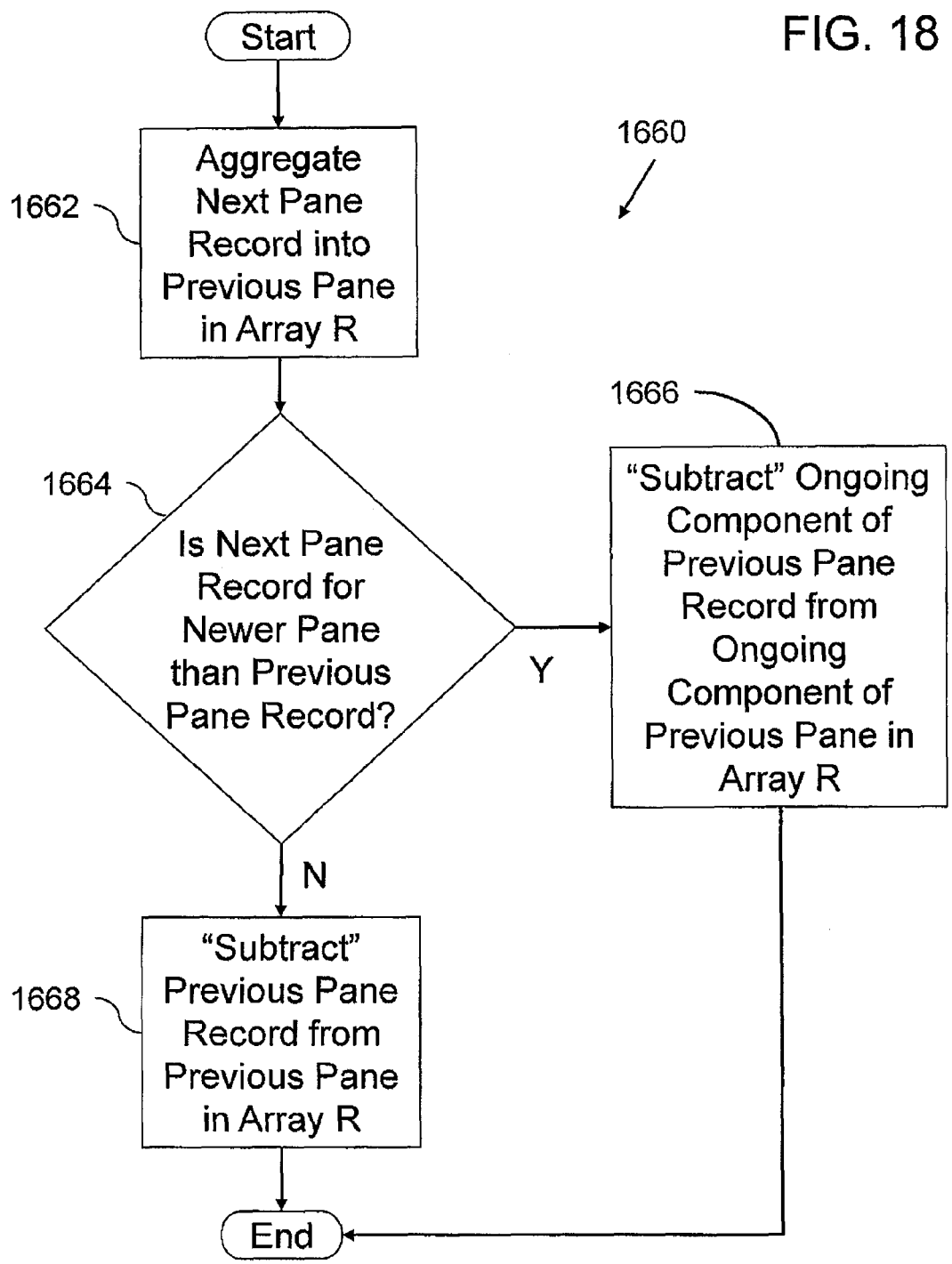

FIGS. 16-18 are flowcharts of processes 1630, 1650, and 1660, respectively, of FIG. 15 executed by a coordinator node for processing a distributed aggregation statistic for a contact center over a sliding interval with low latency, according to one embodiment of the present invention.

In FIG. 16, representing process 1630 of FIG. 15, the next pane record is from a newer pane than the GCP. Accordingly, in one embodiment, the GCP is closed out and added to the circular array R of previous panes while a new GCP is started. In further detail, processing begins, and in step 1632, the ongoing component of the previous pane record is "subtracted" (or otherwise made to not be reflected) from the ongoing component of the GCP. Ongoing components reflect aggregates for ongoing (e.g., uncompleted) events. As such, their aggregates are constantly changing (such as with each new pane), as opposed to historical components, whose corresponding events have either completed or reached a state such that their aggregate statistics can be assumed to no longer change.

To prevent double counting of such statistics, earlier aggregations (e.g., aggregations in ongoing components of earlier pane records) are cleared while the most recent version of the ongoing aggregate is maintained in the ongoing component of the most recent pane record of the slave node 220. In a similar fashion, when the GCP is about to be replaced with a newer GCP, aggregates for ongoing events are cleared (through this "subtracting") from the old GCP as they will be more accurately reflected in the ongoing component of the new GCP.

In step 1634, the GCP is inserted into the circular array R of previous panes, displacing the oldest pane in the process to make room (and preserve the length of the sliding interval being tracked in the array R and the GCP). In step 1636, a new GCP is created and initialized to the next pane record from the slave node 220.

In FIG. 17, representing process 1650 of FIG. 15, the next pane record is from the same pane as the GCP. Accordingly, in one embodiment, the GCP is updated to reflect the partial aggregates of the next pane record while the appropriate pane (GCP or previous pane from the array R) is updated to "subtract" the partial aggregates of the previous pane record from the slave node 220. In further detail, processing begins, and in step 1652, the partial aggregates (ongoing and historical) in the next pane record are aggregated into those of the GCP. In step 1654, a check is made to see if the next pane record represents a newer pane than the previous pane record. If so, then processing proceeds to step 1656, where the ongoing component of the previous pane record is "subtracted" (or otherwise made to not be reflected) from the ongoing component of the previous pane in array R that corresponds to the previous pane record. This is similar to step 1632 in FIG. 16, only operating on a previous pane in the array R of previous panes rather than the GCP.

If, on the other hand, in step 1654, it is determined that the previous pane record is for the same pane (i.e., not an earlier pane) as the next pane record, then processing proceeds to step 1658, where the previous pane record is "subtracted" (or otherwise made to not be reflected) from the GCP. This avoids the double counting that takes place (in both ongoing and historical components) when both the previous pane record and the next pane record from the slave node 220 represent the same pane (namely the GCP in this case).

In FIG. 18, representing process 1660 of FIG. 15, the next pane record is from an earlier pane than the GCP. Accordingly, in one embodiment, the appropriate previous pane(s) in the array R is (are) updated to reflect the partial aggregates of the next pane record and the previous pane record from the slave node 220 in a manner similar to that of process 1650 of FIG. 17. In further detail, processing begins, and in step 1662, the partial aggregates (ongoing and historical) in the next pane record are aggregated into those of the previous pane in the array R corresponding to the next pane record. In step 1664, a check is made to see if the next pane record represents a newer pane than the previous pane record. If so, then processing proceeds to step 1666, where the ongoing component of the previous pane record is "subtracted" (or otherwise made to not be reflected) from the ongoing component of the previous pane in array R that corresponds to the previous pane record. This is similar to step 1656 in FIG. 17.

If, on the other hand, in step 1664, it is determined that the previous pane record is for the same pane (i.e., not an earlier pane) as the next pane record, then processing proceeds to step 1668, where the previous pane record is "subtracted" (or otherwise made to not be reflected) from the previous pane in array R that corresponds to the previous pane record. This avoids the double counting that takes place (in both ongoing and historical components) when both the previous pane record and the next pane record from the slave node 220 represent the same pane (namely the same previous pane in the array P in this case).

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for aggregating and reporting data from a plurality of data sources in a contact center, the method comprising:

maintaining by a computer device the data for a sliding interval comprising a plurality of panes, the data for each of the panes comprising a separate field for an ongoing component for ongoing events and a separate field for a completed component for completed events;

updating by the computer device the data for the sliding interval based on updates for the sliding interval received from one or more of the data sources; and reporting by the computer device an aggregation of the ongoing and completed components of the data sources for the sliding interval to a client in accordance with an expiring of one of the panes.

2. The method of claim 1, further comprising refreshing by the computer device the ongoing component in accordance with the expiring of the one of the panes.

3. The method of claim 2, wherein the refreshing of the ongoing component comprises incrementing by the computer device the ongoing component for one or more of the ongoing events in accordance with a length of the expired one of the panes.

4. The method of claim 1, wherein the maintaining of the data for the sliding interval comprises maintaining by the computer device the ongoing and completed components for each of the panes.

5. The method of claim 4, further comprising upon the expiring of the one of the panes:
creating by the computer device a new one of the panes;
resetting by the computer device the completed component of the new one of the panes; and
transferring by the computer device current data of one or more of the ongoing events from the ongoing component of the expired one of the panes to the ongoing component of the new one of the panes.

6. The method of claim 4, wherein
each of the updates comprises ongoing and completed components for one of the panes from one of the data sources, and
for each update of the updates, the updating of the data for the sliding interval comprises aggregating by the computer device the ongoing and completed components of the update into the ongoing and completed components of the one of the panes.

7. The method of claim 4, wherein the reporting of the aggregation of the ongoing and completed components of the data sources for the sliding interval comprises aggregating by the computer device the ongoing and completed components across all of the panes.

8. The method of claim 1, wherein each of the updates comprises ongoing and completed components for one of the panes from one of the data sources.

9. The method of claim 1, further comprising transferring by the computer device current data of one of the ongoing events from the ongoing component to the completed component when the one of the ongoing events completes.

10. The method of claim 1, wherein the reporting of the aggregation of the ongoing and completed components of the data sources for the sliding interval comprises aggregating by the computer device the ongoing and completed components into a single component.

11. A system for aggregating and reporting data from a plurality of data sources in a contact center, the system comprising:
a processor; and
a non-transitory physical medium, wherein the medium has instructions stored thereon that, when executed by the processor, causes the processor to:
maintain the data for a sliding interval comprising a plurality of panes, the data for each of the panes comprising a separate field for an ongoing component for ongoing events and a separate field for a completed component for completed events;
update the data for the sliding interval based on updates for the sliding interval received from one or more of the data sources; and
report an aggregation of the ongoing and completed components of the data sources for the sliding interval to a client in accordance with an expiring of one of the panes.

12. The system of claim 11, wherein the instructions, when executed by the processor, further cause the processor to refresh the ongoing component in accordance with the expiring of the one of the panes.

13. The system of claim 12, wherein the refreshing of the ongoing component comprises incrementing by the processor the ongoing component for one or more of the ongoing events in accordance with a length of the expired one of the panes.

14. The system of claim 11, wherein the maintaining of the data for the sliding interval comprises maintaining by the processor the ongoing and completed components for each of the panes.

15. The system of claim 14, wherein upon the expiring of the one of the panes, the instructions, when executed by the processor, further cause the processor to:
create a new one of the panes;
reset the completed component of the new one of the panes; and
transfer current data of one or more of the ongoing events from the ongoing component of the expired one of the panes to the ongoing component of the new one of the panes.

16. The system of claim 14, wherein
each of the updates comprises ongoing and completed components for one of the panes from one of the data sources, and
for each update of the updates, the updating of the data for the sliding interval comprises aggregating by the processor the ongoing and completed components of the update into the ongoing and completed components of the one of the panes.

17. The system of claim 14, wherein the reporting of the aggregation of the ongoing and completed components of the data sources for the sliding interval comprises aggregating by the processor the ongoing and completed components across all of the panes.

18. The system of claim 11, wherein each of the updates comprises ongoing and completed components for one of the panes from one of the data sources.

19. The system of claim 11, wherein the instructions, when executed by the processor, further cause the processor to transfer current data of one of the ongoing events from the ongoing component to the completed component when the one of the ongoing events completes.

20. The system of claim 11, wherein the reporting of the aggregation of the ongoing and completed components of the data sources for the sliding interval comprises aggregating by the processor the ongoing and completed components into a single component.

* * * * *